(12) United States Patent
Rayl et al.

(10) Patent No.: US 11,945,532 B2
(45) Date of Patent: Apr. 2, 2024

(54) ROTATABLE CAROUSEL STORAGE UNIT FOR BICYCLES

(71) Applicant: Sportworks Global LLC, Woodinville, WA (US)

(72) Inventors: Eric L. Rayl, Woodinville, WA (US); Gavin Brink, Seattle, WA (US); Paul De La Port, Woodinville, WA (US); Jeffrey Mark Abramson, Edmonds, WA (US); April Johnson, Mill Creek, WA (US)

( * ) Notice: Subject to any disclaimer, the term of this patent is extended or adjusted under 35 U.S.C. 154(b) by 12 days.

(21) Appl. No.: 17/865,528

(22) Filed: Jul. 15, 2022

(65) Prior Publication Data
US 2024/0017779 A1    Jan. 18, 2024

(51) Int. Cl.
*B62H 3/12* (2006.01)
*B62H 3/08* (2006.01)

(52) U.S. Cl.
CPC ............... *B62H 3/12* (2013.01); *B62H 3/08* (2013.01)

(58) Field of Classification Search
CPC .... B62H 3/04; B62H 3/12; B62H 3/08; E04H 6/005
See application file for complete search history.

(56) References Cited

U.S. PATENT DOCUMENTS

| | | | | |
|---|---|---|---|---|
| 668,259 A | * | 2/1901 | Krimmert | B62H 3/12 211/5 |
| 706,718 A | * | 8/1902 | Bradbury | B62H 3/00 211/20 |
| 4,047,614 A | * | 9/1977 | Radek | B62H 3/04 211/20 |
| 5,979,120 A | | 11/1999 | Hollstedt | |
| 2012/0128453 A1 | * | 5/2012 | Lee | E04H 6/005 414/242 |
| 2020/0080333 A1 | * | 3/2020 | Zahn | G07C 9/20 |

FOREIGN PATENT DOCUMENTS

| | | | | |
|---|---|---|---|---|
| EP | 2539212 B1 | * | 6/2014 | ............... B62H 3/00 |
| WO | 9709498 A1 | | 3/1997 | |

OTHER PUBLICATIONS https://www.falco.co.uk/products/cycle-parking/cycle-racks/velowspace%C2%AE-automated-cycle-parking-system.html
https://www.kineticbikeparking.com/kinetic-automation/

* cited by examiner

*Primary Examiner* — Ko H Chan
(74) *Attorney, Agent, or Firm* — Workman Nydegger

(57) ABSTRACT

A bicycle storage unit is disclosed. The unit includes a rotatable bicycle storage carousel that is structured to rotate about a central axis to provide for a dense storage of bicycles, which are stored on the rotatable bicycle storage carousel in a generally vertical orientation. The unit further includes an enclosure surrounding the carousel. The rotatable bicycle storage carousel comprises an elongated central core oriented in a first direction that is orthogonal relative to a plane defined by a base structure of the rotatable bicycle storage carousel. The elongated central core is rotatable relative to the base structure. The carousel further includes multiple bicycle storage assemblies on which bicycles can be hung.

20 Claims, 34 Drawing Sheets

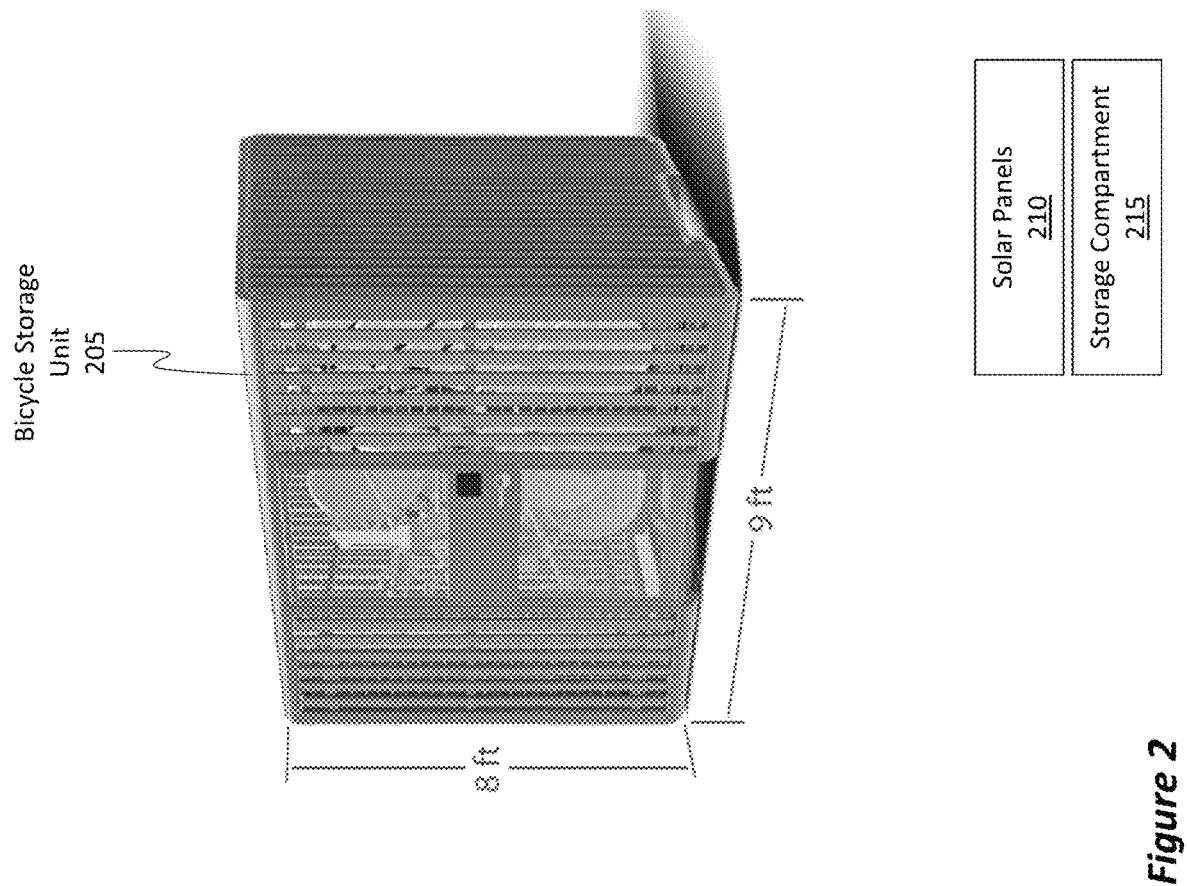
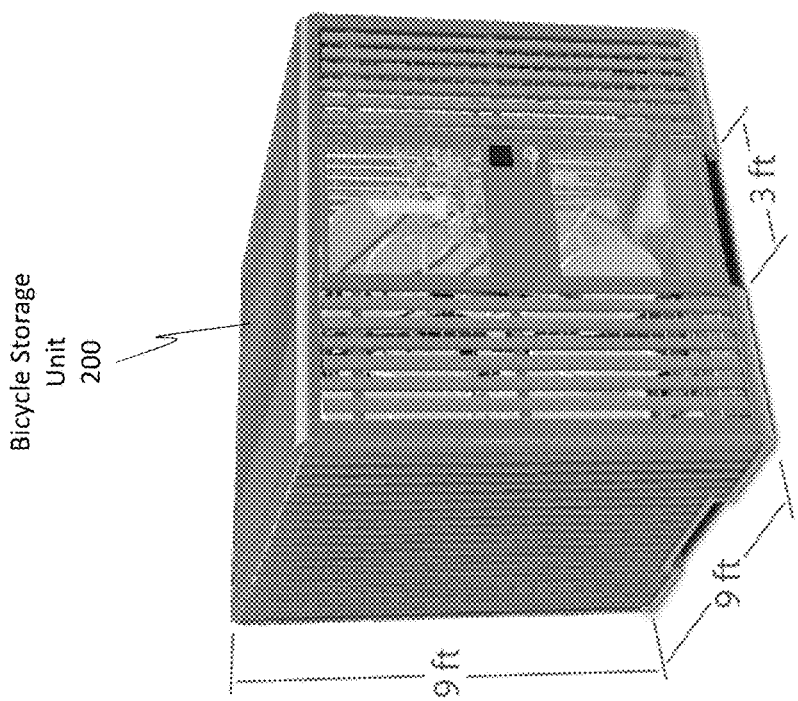
*Figure 2*

Units 300

Angled Perspective
1400

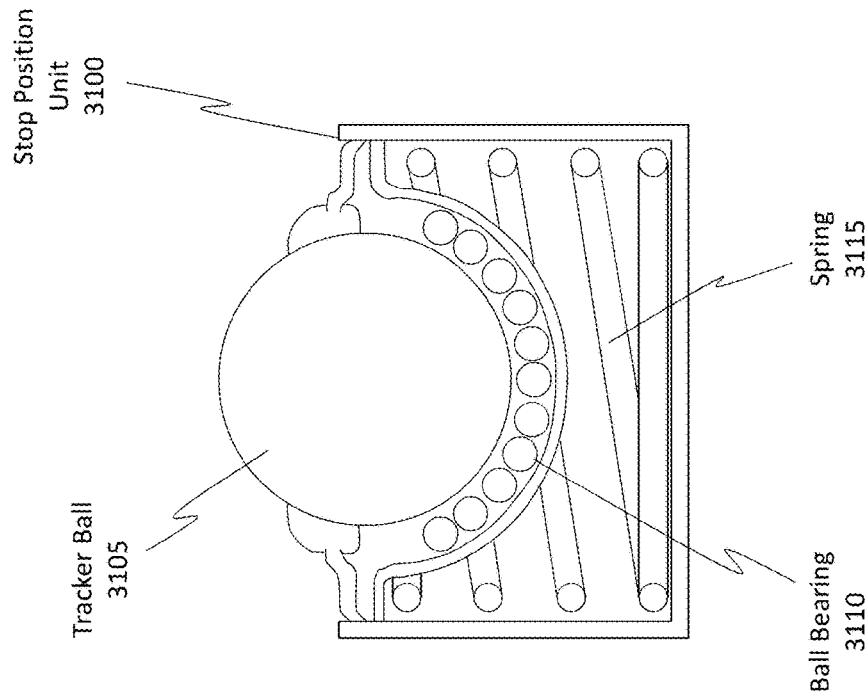
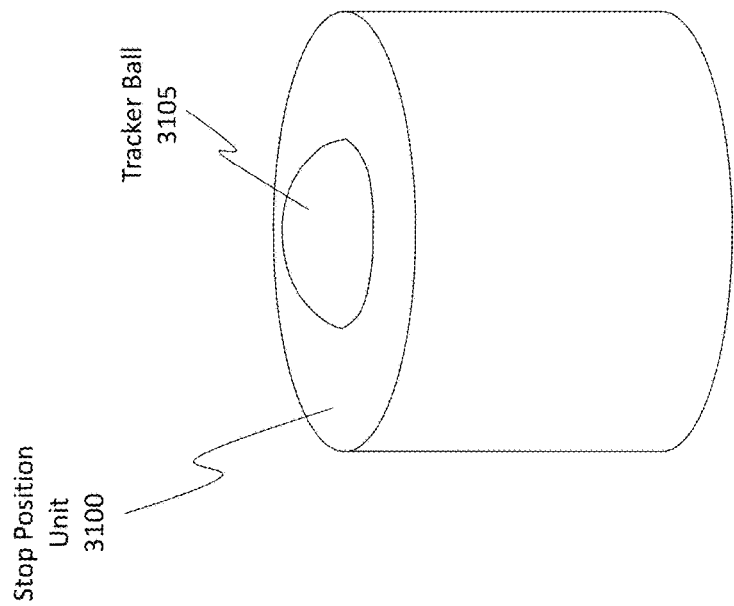
*Figure 31*

ROTATABLE CAROUSEL STORAGE UNIT FOR BICYCLES

BACKGROUND

There are various techniques for storing a bicycle. For instance, homeowners often hang hooks from garage ceilings and store their bicycles on these hooks in a vertical manner. Public areas often have pull-in bicycle racks where bicyclists can pull their bicycles up to a rack and store the bicycle in a horizontal manner. What is needed, however, is an improved apparatus and method for storing and accessing bicycles, where those bicycles are stored in a highly dense manner, are easily accessible, and are stored securely.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 2 illustrates different views of the bicycle storage unit.

FIG. 31 illustrates various aspects of the stop position unit.

DETAILED DESCRIPTION

Figure 1:
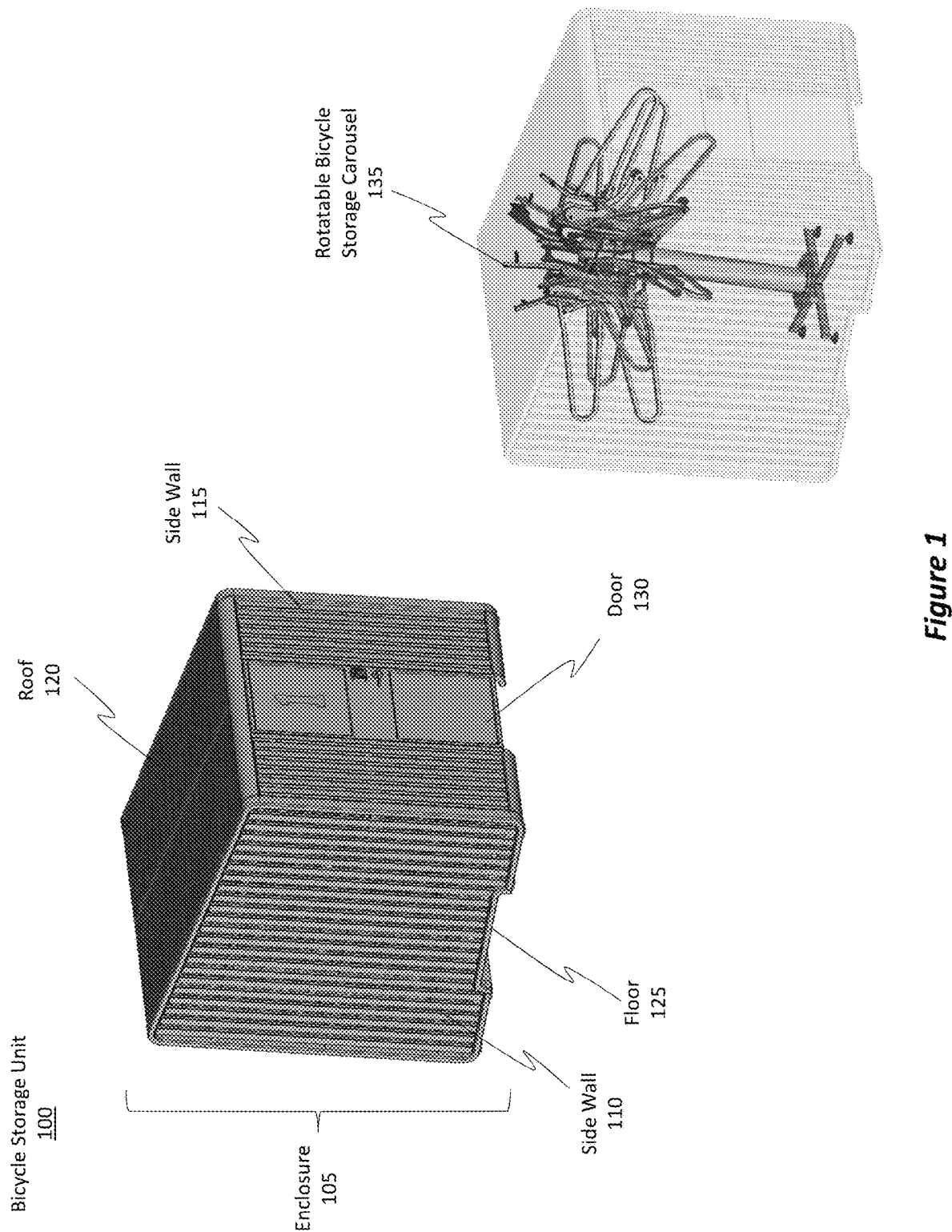
FIG. 1 illustrates an example of a bicycle storage unit according to the disclosed embodiments.

Embodiments disclosed herein relate to apparatuses and methods of use with regard to a bicycle storage unit (or simply "unit").

In some embodiments, a rotatable bicycle storage carousel (or simply "carousel") is structured to rotate about a central axis to provide for a dense storage of bicycles that are stored on the rotatable bicycle storage carousel in a generally vertical orientation. The rotatable bicycle storage carousel comprises an elongated central core oriented in a first direction that is orthogonal relative to a plane defined by a base structure of the rotatable bicycle storage carousel. The elongated central core is rotatable relative to the base structure. The carousel further includes multiple bicycle storage assemblies. Each bicycle storage assembly is attached to the elongated central core such that they are rotatable with the elongated central core. The bicycle storage assemblies are attached to the elongated central core at alternating heights relative to one another. Each bicycle storage assembly includes a first storage assembly comprising a barricade and a wheel hook attached to the barricade. The wheel hook is configured to enable a bicycle tire to hang therefrom. The barricade is configured to at least partially block access to an adjacently located bicycle storage assembly. Each bicycle storage assembly further includes a second storage assembly comprising a wheel cradle that is disposed underneath the wheel hook in the first direction. As a result, when the bicycle tire is attached to the wheel hook, at least a portion of the bicycle tire is simultaneously cradled by the wheel cradle.

In some embodiments, a rotatable bicycle storage carousel includes an elongated central core oriented in a first direction that is orthogonal relative to a plane defined by a base structure of the rotatable bicycle storage carousel, where the elongated central core is rotatable relative to the base structure. The carousel further includes multiple bicycle storage assemblies. Each bicycle storage assembly is attached to the elongated central core such that the bicycle storage assemblies are rotatable with the elongated central core. Each bicycle storage assembly stacks a respective bicycle generally in parallel with the first direction. The carousel further includes a damping member structured to dampen a rotational momentum or velocity of the elongated central core when the rotatable bicycle storage carousel is rotated. The carousel further includes a stop position unit structured to cause the elongated central core to stop at one of multiple available stop positions. Notably, a number of the stop positions is equal to a number of bicycle storage assemblies.

Some embodiments are focused on a bicycle storage unit. This unit includes a rotatable bicycle storage carousel structured to rotate about a central axis to provide for a dense storage of bicycles that are stored on the rotatable bicycle storage carousel in a generally vertical orientation. The rotatable bicycle storage carousel comprises an elongated central core oriented in a first direction that is orthogonal relative to a plane defined by a base structure of the rotatable bicycle storage carousel. The elongated central core is rotatable relative to the base structure. The carousel further includes multiple bicycle storage assemblies. Each bicycle storage assembly is attached to the elongated central core such that the bicycle storage assemblies are rotatable with the elongated central core. Each bicycle storage assembly stacks a respective bicycle generally in parallel with the first direction. The unit further includes an enclosure, which is structured to surround the rotatable bicycle storage carousel and which is structured to restrict access to the rotatable bicycle storage carousel. The enclosure comprises 4 side walls. Optionally, a roof can be connected to the 4 side walls. The enclosure further includes a lockable door that is disposed in a first side wall included among the 4 side walls. The rotatable bicycle storage carousel is rotatable within a confines of the enclosure, and access to a bicycle stored on the rotatable bicycle storage carousel is restricted.

Some embodiments are directed to methods of storing and accessing a bicycle in a bicycle storage unit, where the bicycle storage unit includes a rotatable bicycle storage carousel structured to rotate about a central axis to provide for a dense storage of bicycles that are stored on the rotatable bicycle storage carousel in a generally vertical orientation and where the bicycle storage unit further includes an enclosure structured to surround the rotatable bicycle storage carousel and structured to restrict access to the rotatable bicycle storage carousel via a lockable door. Some embodiments validate user credentials that are presented to the bicycle storage unit, where the rotatable bicycle storage carousel includes multiple bicycle storage assemblies that are each structured to store a respective bicycle. The user credentials are associated with a particular bicycle storage assembly on which a bicycle is being stored on. The embodiments detect a rotation of the rotatable bicycle storage carousel. The rotatable bicycle storage carousel is rotatable throughout multiple stop positions to thereby present, via the rotation of the bicycle storage carousel, different ones of the bicycle storage assemblies before the lockable door. The embodiments also detect that the rotatable bicycle storage carousel has rotated to a particular stop position that is associated with the particular bicycle storage assembly on which the bicycle is being stored such that the particular bicycle storage assembly, and thus the bicycle, are both presented before the lockable door. The embodiments cause the lockable door to transition from a locked state to an unlocked state in response to (i) the validation of the user credentials and (ii) the particular bicycle storage assembly being stopped at the particular stop position such that the bicycle is presented before the lockable door. Notably, while the lockable door is open, the rotatable bicycle storage carousel is prevented from being rotated. Furthermore, while the lockable door is open, access to adjacent bicycle storage assemblies relative to the particular bicycle storage assembly is hindered via barricades such that access to any adjacently stored bicycles is also hindered via the barricades.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

Bicycle parking practitioners generally agree on the desired features of both short term bicycle parking and long term bicycle parking. Presently, outdoor long term bicycle parking is of two types: (i) bicycle lockers and (ii) enclosed shelters having limited access. Each has advantages and disadvantages.

For instance, lockers provide for: full security, both for the bicycle and for any accessories attached to the bicycle; lockers can be later moved based on use and need; and banks of lockers can be expanded if space is available. On the other hand, lockers generally have poor storage density (e.g., bicycles per square foot of surface area); the storage price per bicycle is expensive; lockers are aesthetically unappealing; access aisles for lockers must be provided at both ends of 2-bicycle lockers, thereby further reducing density; stacked lockers require awkward bicycle lifting for upper lockers; lockers must be anchored to a flat hard surface; it is not easy to tell whether a locker is occupied or unoccupied; and lockers do not fit long (e.g., cargo) bicycles or tall (e.g., European omafiets style) bicycles.

Enclosed shelters provide for good storage density; they can be attractive; it is often relatively easy to tell if parking spaces are available; and the shelters can be configured to accommodate a variety of bicycles. On the other hand, the storage price per bicycle is often very expensive for enclosures; enclosures typically do not provide full security; other users have access to the same space; building permits are often required; concrete floor slabs and footings are typically required; shelters are slow to deploy and, once deployed, they are permanent; and their footprint is fixed and not expandable.

The disclosed embodiments, on the other hand, solve almost all of the disadvantages of both lockers and enclosed shelters, with particular focus on providing excellent density, full bicycle security, ease of deployment, modularity/configurability, and reasonable cost, while also providing the benefits of both lockers and shelters. In particular, the disclosed embodiments are generally directed to bicycle storage units and the use thereof. These bicycle storage units are beneficially configured to provide full security, both for a bicycle stored within the unit and for any accessories that may be attached or otherwise associated with the bicycle (e.g., the accessories can also be stored in a locker that is a part of the unit). Beneficially, the unit is highly portable yet can be stored securely in place so as to prevent theft. The unit can also be associated or linked with other units to provide an entire bank of units capable of providing expanded space and other functionalities (e.g., a changing room, shower, repair shop, tire pump, vending machine, bicycle wash station, and so on). Some units can be reserved for storing oddly sized bicycles, such as cargo bicycles, tandems, or even recumbent bicycles.

Another advantage relates to the ability of the unit to store bicycles in a highly compact, or dense, arrangement. With traditional bicycle storage units, up to 40% of the space was considered "wasted" because that space was required as the "aisle" to navigate the bicycle into and out of the traditional unit. The disclosed embodiments are beneficially configured to eliminate this wasted space. These advantages are achieved via use of a so-called "rotatable bicycle storage carousel," which will be described in more detail later. Briefly, however, the carousel can store multiple bicycles and is also rotatable, thereby allowing multiple bicycles to be densely stored without the need for providing large amounts of aisle space.

The unit also reduces the storage price per bicycle as compared to other units, in part due to a reduced footprint that the embodiments provide. The embodiments also allow for bicycles to be stacked or stored at alternating heights. Doing so helps with preventing frustrations that might otherwise occur due to handlebars or pegs hitting one another. That is, by stacking the bicycles at alternating heights, the handlebars and pegs will no longer interfere with one another.

Another advantage relates to the ease by which users can determine whether there is room in the unit to store their bicycles. The units can be equipped with sensors (e.g., perhaps an optical sensor and/or a weight/pressure sensor) to determine whether the units can store additional bicycles. An indicator can be prominently displayed on the unit so users can see from afar whether or not space is available in the unit. Thus, the embodiments significantly improve the user's experience.

The embodiments further improve the user's experience by providing an intuitive user experience and user interface that can be presented on any type of smart device (e.g., a tablet, phone, laptop, etc.). The user interface is a part of an application that can communicate with a cloud service to enhance the user's experience with the bicycle storage unit. The cloud service can collect different types of telemetry data, as will be discussed in more detail later. This data can beneficially be used to determine where and when to deploy units.

Yet another advantage relates to the ease by which the units can be deployed. In some cases, metrics or usage data (i.e. telemetry data) can be monitored to determine whether a unit is being used to a desired level. If a unit is being underutilized, the unit can be easily transported to another location in an effort to increase its usage. Such benefits can be realized due to the ease by which the units are transportable. Accordingly, the disclosed embodiments provide excellent bicycle storage density, bicycle storage, ease of deployment, modularity, and cost benefits. These and numerous other benefits will be discussed in more detail throughout the remaining portions of this disclosure.

Overview of a Bicycle Storage Unit

Having just described some of the various benefits of the disclosed embodiments, attention will now be directed to FIG. 1, which illustrates an example bicycle storage unit 100 according to the disclosed principles. Beneficially, the disclosed bicycle storage unit 100 is able to store bicycles with a density of about 6.75 sq. ft per bicycle as compared to traditional storage units that often require more than 10 sq. ft per bicycle. Furthermore, traditional storage units often require an access aisle on both ends, further increasing their footprints up to about 20 sq. ft per bicycle. The disclosed unit, on the other hand, does not require a dedicated aisle per bicycle.

The bicycle storage unit 100 is shown as including an enclosure 105. This enclosure 105 includes four side walls (two of which are illustrated as side wall 110 and side wall 115). Optionally, the enclosure 105 can further include a roof 120, which can optionally be angled to allow precipitation to run off of the unit. Optionally, the roof can be structured as a green roof on which plants can grow. Optionally, solar panels can be disposed on the roof 120 and/or on any of the side walls. If the unit is an indoor unit, then the unit might not have the roof 120. For instance, if the unit is stored in a parking garage, subway, or other transit center, then the unit can avoid having a roof.

In some cases, the bicycle storage unit 100 may be equipped with gutters to help direct the runoff to a desired location. In some cases, the angle of the roof can be more or less pronounced. As examples only, the angle of the roof 120 can be anywhere from a 5 degree angle to a 30 degree angle. By sloping the roof forward (e.g., towards the end with the door), multiple units can be placed back-to-back.

In some embodiments, the bicycle storage unit 100 also includes a floor 125. The floor 125 can be present when the bicycle storage unit 100 is located in an outdoor environment. Optionally, the floor can be comprised of a solid yet water permeable substance. In scenarios where the bicycle storage unit 100 is located indoors, it may be the case that the floor 125 is removed. In some optional cases, one or more of the side walls can also be removed when the bicycle storage unit 100 is located in an indoor setting. As an example only, if the bicycle storage unit 100 were located indoors in a corner area where two walls meet, two of the side walls (corresponding to the walls that otherwise meet in the corner) can optionally be removed. Accordingly, the roof, the floor, and one or more side walls can optionally be removed.

The bicycle storage unit 100 is also shown as including a door 130 in the side wall 115. The door 130 is a lockable door that requires user credentials to unlock the door. In some cases, the lock on the door is unlockable for maintenance access and power failure access.

The user credentials can be of any type. As examples only, the user credentials can be in the form of a physical key that unlocks the door 130. In some cases, the user credentials can be in digital form and can be presented to a card reader associated with the door 130. The user credentials can be presented in the form of a card that is presented to the reader or even perhaps via a user's smart device. Indeed, any type of user credentials can be used by the disclosed embodiments. Further details on this aspect will be provided later.

In some cases, the floor 125 may be an elevated floor such that materials disposed on the floor are elevated relative to the actual ground. Elevating these materials can be beneficial for numerous reasons, such as by preventing pests (e.g., rodents) from reaching the bicycles that are stored in the bicycle storage unit 100, dirt or such as by preventing equipment from resting on the hot ground surface.

The bicycle storage unit 100 further includes a rotatable bicycle storage carousel 135. This carousel is designed to hang or stack a predetermined number of bicycles. Because the carousel is rotatable, the embodiments eliminate the need for aisle space (per bicycle) to be included as a part of the bicycle storage unit 100. As will be described in more detail later, now, a user simply presents his/her bicycle before the door, opens the door, and then a bicycle storage assembly on the carousel will be presented before the door for the user to hang his/her bicycle on. Further details on this aspect will be provided later.

FIG. 2 illustrates a bicycle storage unit 200 and 205, along with some example dimensions. One will appreciate how these dimensions are provided for example purposes only and should not be viewed as being the only available set of dimensions.

In some cases, the rear end height of the bicycle storage unit 200 can be approximately 9 ft tall. In some cases, the rear end height can be even taller, such as perhaps anywhere from about 9 ft up to about 12 ft. In some cases, the front end height can be approximately 8 ft tall, thereby providing an angled roof. In some cases, the front end height can be even taller, such as anywhere from about 8 ft to about 12 ft.

In some cases, the depth of the bicycle storage unit 200 can be the same as the rear end height or perhaps even the front end height. For instance, FIG. 2 shows the depth as being 9 ft. In some cases, the depth can be anywhere from 9 ft up to about 12 ft.

FIG. 2 shows that the width of the bicycle storage unit 205 can be about 9 ft wide. Therefore, in some embodiments, the footprint of the bicycle storage unit can be a square with a dimension of 9 ft by 9 ft such that the footprint is less than 100 sq. ft. With these dimensions, it is typically the case that no building permit will be required in most jurisdictions to deploy the unit. The weight of the carousel, when fully loaded with bicycles, is often between about 200 lbs. to 400 lbs.

In some cases, the width can be anywhere from 9 ft to 12 ft. In some cases, the width is different than the depth while in some cases they are the same. For instance, in some embodiments, the unit has a rectangular shape as opposed to a square shape. In some cases, the width is different than the height while in some cases they are the same.

FIG. 2 also shows the dimensions of the door. That is, in some embodiments, the lockable door of the bicycle storage unit 200 can be about 3 ft. wide and about 8 ft. tall. In some cases, the width can be wider, such as anywhere from 3 ft. up to about 5 ft. wide. The height can also vary, such as perhaps between about 8 ft. tall to about 12 ft. tall.

Some embodiments equip the bicycle storage unit 200 with one or more solar panels 210, which can be disposed on any of the side walls and/or on the roof. These solar panels 210 can power any electronics that are associated with the bicycle storage unit 200, such as perhaps the card reader, servomotors associated with the carousel, a network communication device, and so on. In some cases, the bicycle storage unit 200 further includes an Internet of Things (IoT) device or perhaps another device capable of network connectivity. With this device, the unit can communicate with a cloud service. Further details on this aspect will be provided later. Accordingly, all of the power needs of the unit can be provided from the solar panels, which can be integrated with the roof and/or side walls and which can include storage batteries.

Optionally, the bicycle storage unit 200 can be equipped with one or more storage compartment(s) 215, such as in the form of a locker. These locker(s) can be accessed via a locker door disposed on the outside of the bicycle storage unit 200, and a locker can have a depth that extends inwardly within the bicycle storage unit 200. Optionally, these lockers can use the same mechanism as the main door for unlocking the locker (e.g., perhaps an RFID card reader or some other access validation). In some cases, the lockers can also incorporate a de-humidifier device to dry a user's gear.

As will be described in more detail later, the rotatable bicycle storage carousel disposed within the enclosure has a general cylindrical shape whereas the enclosure has a cube-like shape. Thus, there is some space available within the enclosure, particularly near the corners where the walls meet. The lockers can utilize this space to store additional user equipment, such as perhaps clothing, helmets, personal items, or anything else.

In some cases, the enclosure is formed of different materials, such as metal or some other robust material. In some cases, the side walls and/or the roof can include slats or slots between panels, as generally shown in FIG. 2, thereby promoting airflow through the unit. In some cases, the unit is available with a variety of both transparent, semi-transparent, or opaque walls. The walls can be personalized based on various design constraints or preferences.

With these slots, users can see the internals of the bicycle storage unit. In some cases, the side walls and/or roof is a continuous unit and does not include slats. The determination as to whether a unit includes slats can be based on where the unit will be located.

That is, the environment can be a factor in determining the configuration of the unit. Environments that have a threshold level of precipitation may not have slats while environments that have less than the threshold level may have slats. Environments that have average yearly temperatures above a threshold level may have slats in order to promote airflow through the unit whereas environments that have yearly temperatures below a particular threshold may not have slats (e.g., it may be advantageous to not have slats in a snowy environment to prevent the buildup of snow inside the unit).

Figure 3:
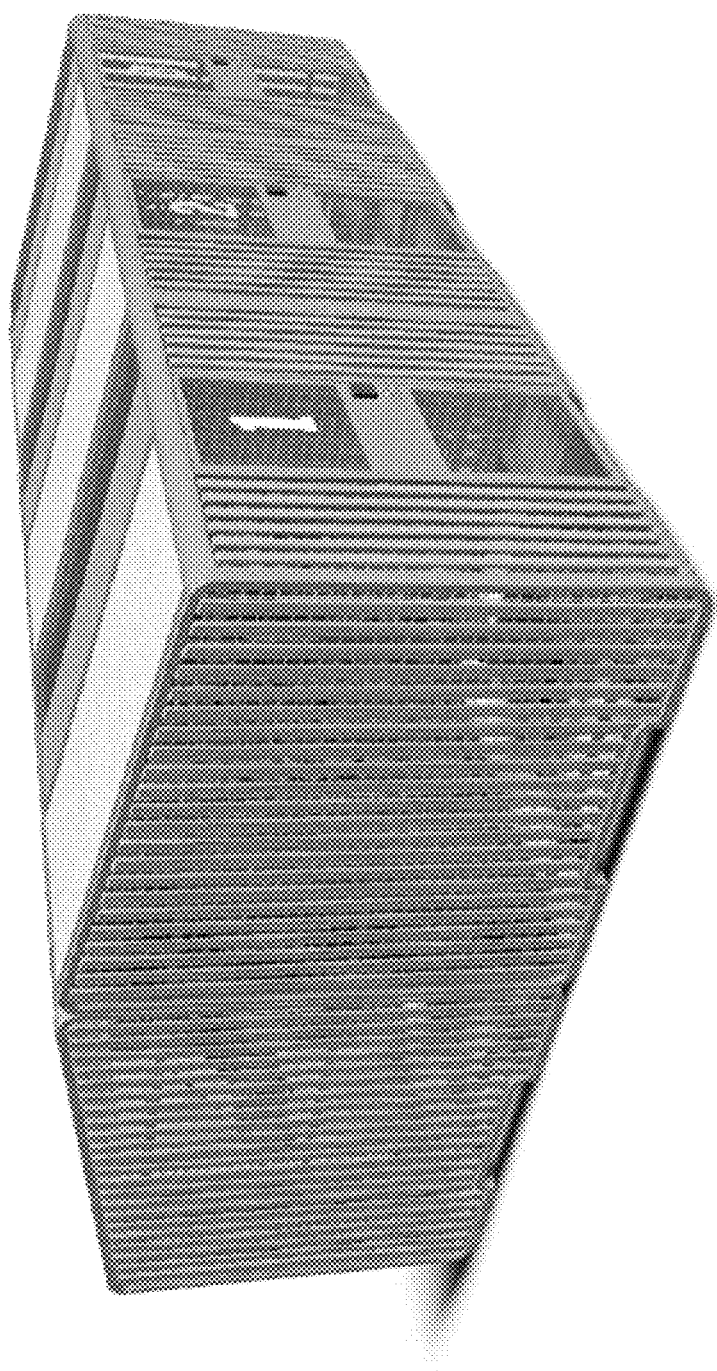
FIG. 3 illustrates how different bicycle storage units can be arranged relative to one another.

FIG. 3 shows a number of units 300 that can be nested or arranged next to one another or within a threshold distance relative to one another. In some cases, each unit can be equipped with an interlocking arm to enable one unit to be connected or linked to another unit. One unit can be connected with another unit on its rear end as well as on the side ends relative to the side wall that has the door. Thus, the units can be connected in a daisy chain manner. Accordingly, various units can be placed back-to-back and side-to-side relative to one another.

In some implementations, multiple units can be spaced apart with a bridging roof spanning the space therebetween. With this configuration, the units can provide a typical bus stop function between bicycle parking shelters or units. Optionally, the user's key card can be integrated with the local public transit system card.

Some of the units may include the rotatable bicycle storage carousel for storing bicycles. Other units can include other features, such as changing rooms, showers, repair tools, and so on. Optionally, the units can be used for bicycle share opportunities, and the units can store normal or high end bicycles as compared to low-performance bicycles that are often provided with typical bicycle share techniques.

In some implementations, a unit can be equipped with an exterior display that is readily viewable from a distance. This display can indicate whether spaces are available in the unit to store a bicycle. Optionally, the display can show other information that might be obtained from the Internet, such as perhaps the predicted weather, traffic patterns, and so on. The display can also show the local public transit options, locations, and schedules.

In some implementations, a unit can include an antibacterial spray device to spray the unit and/or the bicycles for sanitizing purposes. In some cases, the unit can include a fragrance spray device to help with unpleasant smells.

Figure 4:
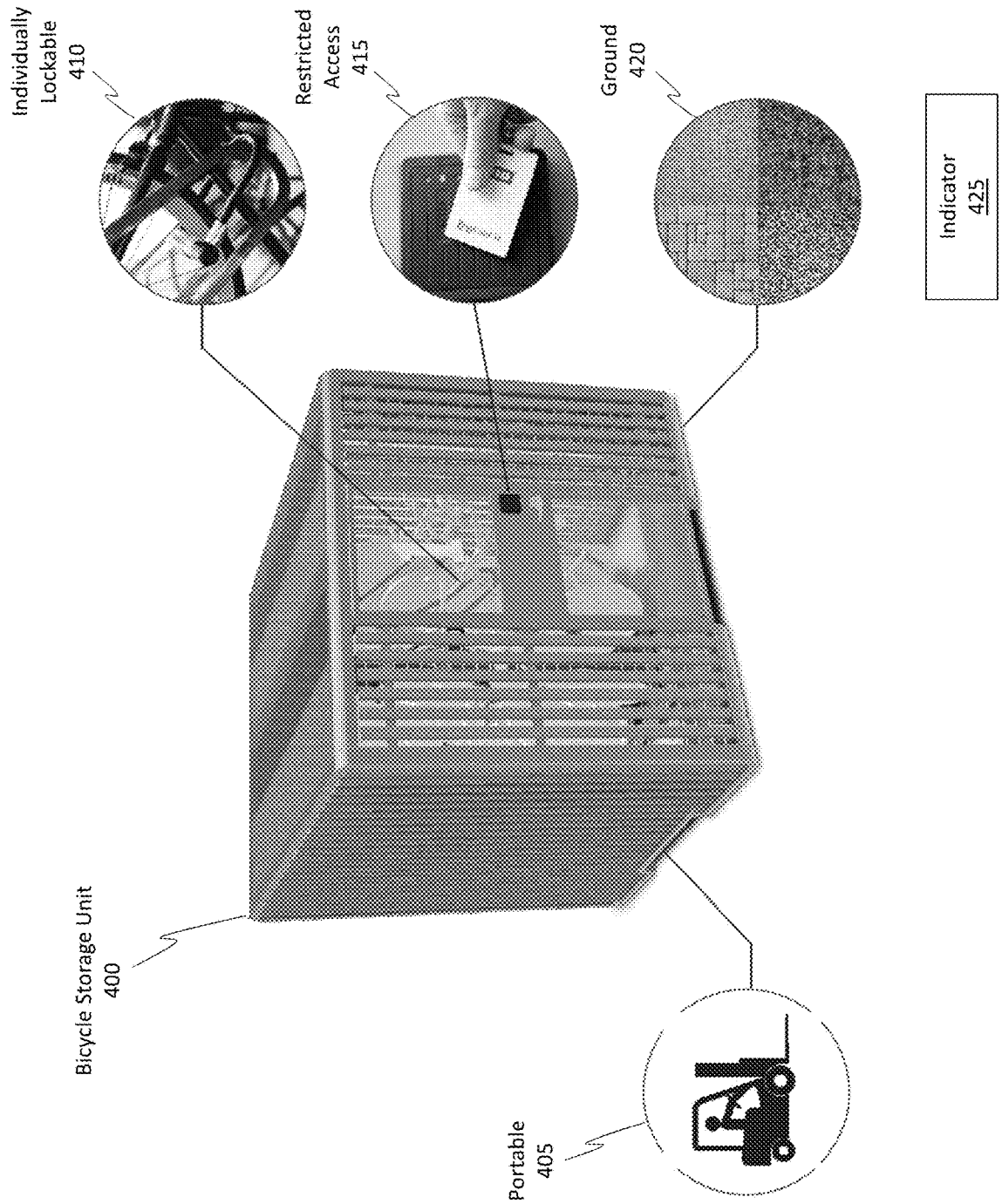
FIG. 4 illustrates different features of the bicycle storage unit.

FIG. 4 shows an example bicycle storage unit 400 that is representative of those discussed thus far. The bicycle storage unit 400 is light enough in terms of weight that it can be portable 405 via a forklift or perhaps even a dolly. The weight of the unit as a whole (e.g., both the carousel and the enclosure) is often between about 200 lbs. and 400 lbs. when not loaded with bicycles. The unit can be shipped as flat panels and components, which can then be easily assembled on site.

The bicycle storage unit 400 also includes options to enable bicycles stored therein to be individually lockable 410, if so desired. For instance, a user can bring his/her own U-lock and can lock his/her bicycle within the bicycle storage unit 400. Other lock types can also be used. Thus, not only will the lockable door provide security, but the user's own lock will also provide security.

Regarding security features, some embodiments equip the bicycle storage unit 400 with one or more cameras that can connect to the Internet to provide live streaming. The cameras can be disposed inside of the bicycle storage unit 400 to monitor the bicycles. In some cases, the cameras can also be disposed on the outside of the bicycle storage unit 400 and can monitor the door entrance as well as the perimeter around the bicycle storage unit 400.

In some cases, the bicycle storage unit 400 can be equipped with motion sensors. When motion is detected by these sensors, the sensors can trigger the cameras to turn on and begin recording and/or streaming. In some cases, the bicycle storage unit 400 can be equipped with flood lights as well, and these flood lights can also optionally be triggered by the motion sensors. These various pieces of electronic equipment can optionally be powered by the solar panels (and/or any other type of energy storage device) mentioned earlier. In some cases, the unit is equipped with lighting that can be switched on by a photocell sensor. In some implementations, the unit can even be equipped with electric bicycle charging equipment. As another option, the unit can be integrated with other charging features, such as hardware to charge a headlight for a bicycle or perhaps equipment to charge a smart device or radio.

In some cases, the embodiments permit users to view a live stream camera recording of their bicycles. For instance, using a user interface displayed via the user's smart device, a user can stream a live recording of his/her bicycle while the bicycle is stored in the bicycle storage unit 400. In some implementations, the user application associated the user interface can provide a notification in response to various events. As one example only, a notification can be provided anytime the door to the bicycle storage unit 400 is opened. As another example, a notification can be provided in response to a weight sensor indicating the user's bicycle weight has shifted. A notification can optionally be provided in response to the rotatable bicycle storage carousel being rotated. In some cases, a notification can be provided in response to the motion sensor detecting motion, either inside or outside of the bicycle storage unit 400.

Optionally, the unit can include an externally mounted flip-down seat to allow a user to changing into and out of his/her cycling shoes or for other uses. Other convenience mechanisms can also be provided by the unit, such as perhaps a water spigot.

FIG. 4 also shows how the bicycles within the bicycle storage unit 400 are protected via restricted access 415. That is, the door is lockable and will be unlocked in response to sufficient user credentials being presented to the door. In some cases, the user credentials can be stored on a key FOB, NFC device, Bluetooth device, or perhaps a radio-frequency identification (RFID) chip and can be presented to an RFID sensor located on the bicycle storage unit 400. In some cases, the user credentials can be associated with a user account on the user's smart device. When the user is proximate to the bicycle storage unit 400, the user can select an "Open" option on the user interface to open the door. Optionally, the application can use the GPS coordinates of the user's smart device to determine whether the user is within a threshold distance relative to the bicycle storage unit 400. If the user is physically within the threshold distance and if the user selects the button while within that distance, then a cloud service can trigger the unlocking of the door. In some cases, the user credentials can even be in the form of a physical key that can be used to unlock the door.

Optionally, the lockable door might be opened only if the user is in front of the door and is within the threshold distance of the door. The embodiments can utilize a camera that is directed toward the area in front of the door. The camera can be calibrated (e.g., single camera calibration) to determine whether the user is within the threshold distance.

In some cases, the embodiments use biometric data as the user credentials. For instance, the embodiments can scan a user's fingerprint and/or can scan the user's iris. This information can be stored during the time period while the user's bicycle is in the bicycle storage unit 400. That information can be deleted from the system after the bicycle is no longer stored in the bicycle storage unit 400.

Some embodiments rely on facial recognition as the user's credentials. For instance, the embodiments can cause a camera to scan the user's face and can then link the bicycle to that user. The user can then store the bicycle in the bicycle storage unit 400. Later, when the user returns, the camera can take an image of the user's face and analyze that image, perhaps using machine learning facial recognition technology. If the image matches the image obtained previously (e.g., when the user first stored his/her bicycle), then the door will be unlocked; otherwise, the door will remain locked. Further aspects regarding the network connectivity of the unit will be provided later.

Some embodiments equip the door with a spring or hydraulic mechanism to influence the door to close after the user finishes storing his/her bicycle. In some cases, the door can perhaps be a rollup door as opposed to a hinge-based door.

FIG. 4 also shows the ground 420. The ground 420 represents how the bicycle storage unit 400 can be placed on any type of surface, provided that surface is sufficiently level. The surface can be an outdoor surface (e.g., grass, dirt, concrete, rubber, etc.) or even an indoor surface. Indeed, the unit can be placed on any type of surface. As mentioned previously, some embodiments include an elevated floor such that the rotatable bicycle storage carousel inside of the unit is elevated off of the actual ground. Accordingly, the disclosed unit can be placed on any reasonably level surface, and no concrete slab is required. In some cases, levelling feet can be integrated with the unit to enable the unit to be level.

In some cases, automatic leveling can be utilized. Beneficially, no surface preparation is required.

Some embodiments equip the bicycle storage unit 400 with an indicator 425 that can indicate whether the unit is full or whether it has storage capacity. The indicator 425 can, for example, be a light (e.g., an LED, fluorescent, or any other type of light). In some cases, the indicator 425 can also be a display or screen. The indicator 425 can be positioned on the unit at a location that is readily observable to users. For instance, the indicator 425 can optionally be placed on the front of the door or perhaps above the door. The indicator 425 can be color coded, such as green to indicate capacity or red to indicate a lack of capacity. In some cases, no color coding is used, and the fact that the light is on indicates capacity and the fact that the light is off indicates a lack of capacity. When in the form of a display, then numerous different types of information can be displayed, such as reservation times, peak usage hours, and so on.

In some cases, the indicator 425 can be a part of a larger digital display, such as perhaps a television screen or other large screen associated with the bicycle storage unit 400. In scenarios where the enclosure has slots, some embodiments dispose the indicator 425 inside of the unit, and the light leaks out through the slats. For instance, the indicator 425 may be an LED light disposed inside of the unit, and the LED light may be green to reflect capacity or red to reflect the lack of capacity. Because the enclosure has slats, the green or red light will be visible from an outside position relative to the bicycle storage unit 400.

Figure 5:
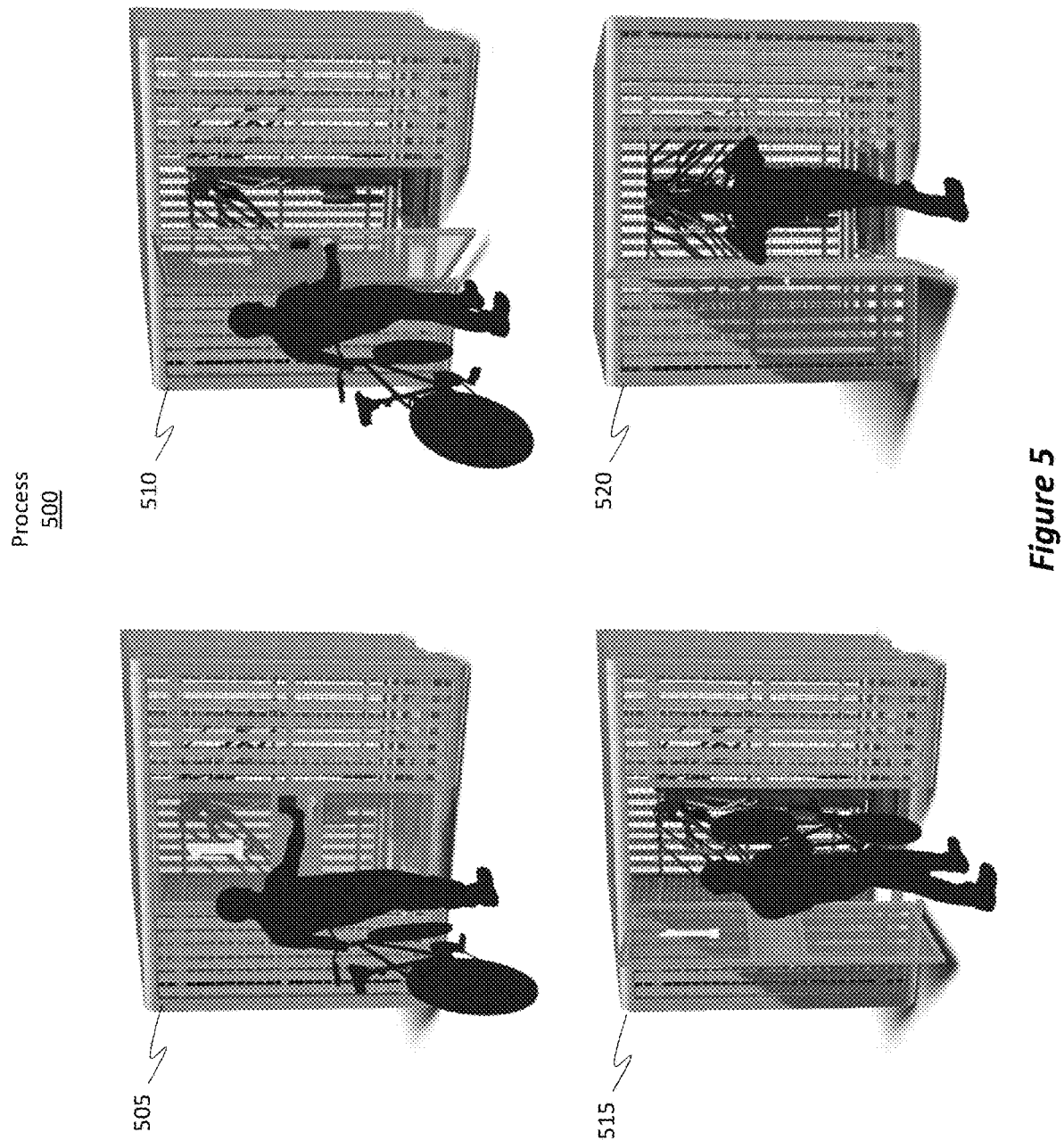
FIG. 5 illustrates an example technique for utilizing the bicycle storage unit.

FIG. 5 illustrates an example usage of the bicycle storage units mentioned thus far. In particular, FIG. 5 shows a process 500 for accessing and storing a bicycle in the disclosed bicycle storage units.

In a first step (not illustrated), an empty bicycle storage assembly (i.e. one on which a bicycle is not currently hanging from) is rotated to a position before the door. This rotation can occur manually or it can occur automatically, such as via the use of an electric motor. When performed manually, the embodiments include a grabbable rotation disc or other grabbable portion that is accessible even from the outside of the bicycle storage unit. The user can grab this portion, which is connected to the rotatable bicycle storage carousel, and begin to rotate it (and thus the carousel) until an empty bicycle storage assembly is presented before the door, which is not yet opened.

As will be described in more detail later, the rotatable bicycle storage carousel can include a damping member to help restrict the momentum or velocity of the carousel so that the carousel is not spun at a speed that exceeds a threshold speed. Furthermore, the rotatable bicycle storage carousel can be equipped with a number of stop positions to help align a bicycle storage assembly before the door. Further discussion on these aspects will be provided later.

After an empty bicycle storage assembly has been presented before the door, step 505 includes the user presenting a set of user credentials to the bicycle storage unit. This step can be performed using a key, RFID key card, or even perhaps using a smart device application. In some cases, the user may be required to be within a threshold distance relative to the unit, where that distance can be monitored via GPS data. As an example, suppose the user is required to be within 5 feet of the door in order to open the door.

In this example scenario, the user credentials can be in the form of a user account with the application. The user can use the application to trigger the door to unlock. Step 510 shows the user opening the door after the user presented his/her credentials.

Step 515 includes the user hanging his/her bicycle on the empty bicycle storage assembly. Notice, the bicycle is hung in a vertical orientation, which is an orientation that is orthogonal relative to the base of the unit. By hanging the bicycle in this manner, the embodiments significantly reduce the amount of space that is required in order to store a bicycle. Step 520 further shows the user maneuvering the bicycle into place.

The bicycle storage assembly on which the bicycle is now stored is now associated with the user's credentials. Later, when the user's credentials are presented to the unit, the door will be unlocked only if that particular bicycle storage assembly, which is storing the user's specific bicycle, is presented before the door, whether via manual rotation or via motor assisted rotation. The door will not open if other bicycles are presented before the door. Further details on this aspect will be provided later.

Perspective Views of the Enclosure

FIGS. 6, 7, 8, and 9 illustrate various perspective views of the enclosure. These figures are provided to help facilitate an understanding of various features of the enclosure. One will appreciate how these various illustrations are provided for example purposes only.

Figure 6:
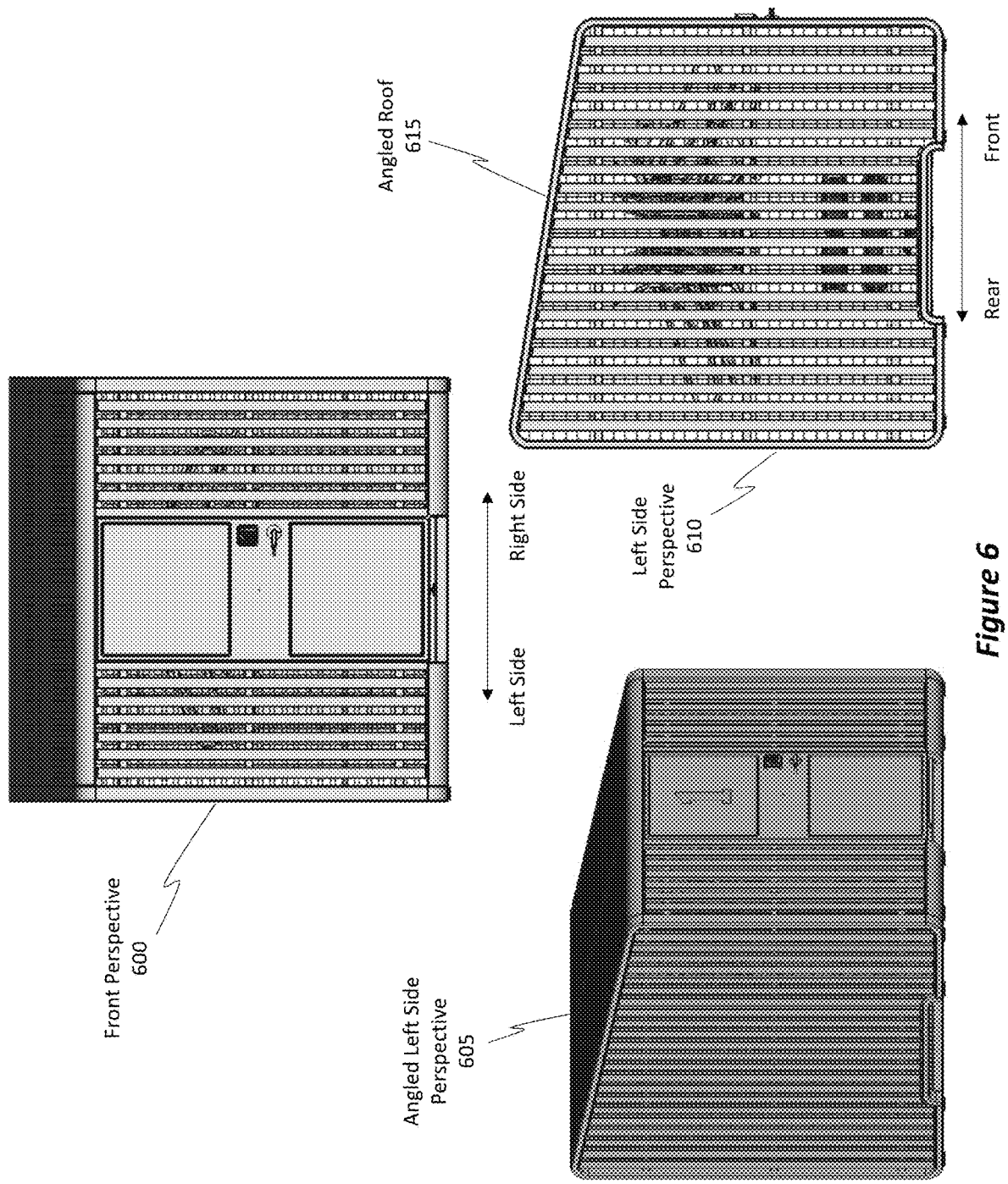
FIG. 6 illustrates different perspective views of the bicycle storage unit.

FIG. 6 shows a front perspective 600 view of the enclosure. The front includes the side wall that has the lockable door. In some implementations, the doors or the enclosures can be labeled, such as perhaps with a number (e.g., "1") or letter to assist users in recalling which unit he/she stored a bicycle. The unit numbers or letters can be logged in the user's account when the user uses a unit.

As used herein, when viewed from the front perspective 600, the region to the left of the door is the "left" side and the region to the right of the door is the "right" side, as indicated by the legend. FIG. 6 also shows an angled left side perspective 605 and a left side perspective 610. From the left side perspective 610, one can observer the angling or slope of the roof, as labeled by the angled roof 615. The legend associated with the left side perspective 610 also shows the front versus rear of the unit. The side wall having the door is the front; the opposite end is the rear.

Figure 7:
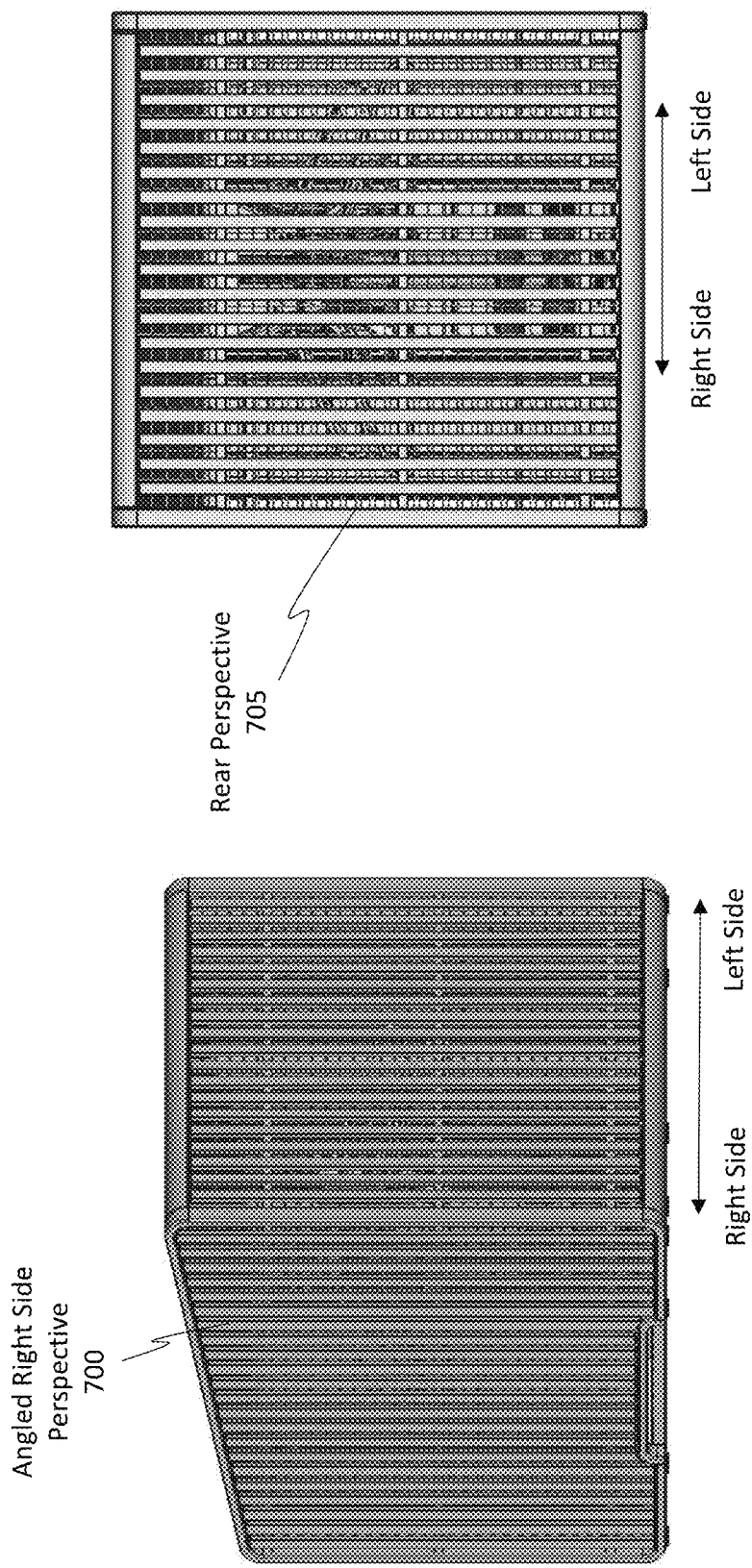
FIG. 7 illustrates different perspective views of the bicycle storage unit.

FIG. 7 shows an angled right side perspective 700. FIG. 7 also shows a rear perspective 705.

Figure 8:
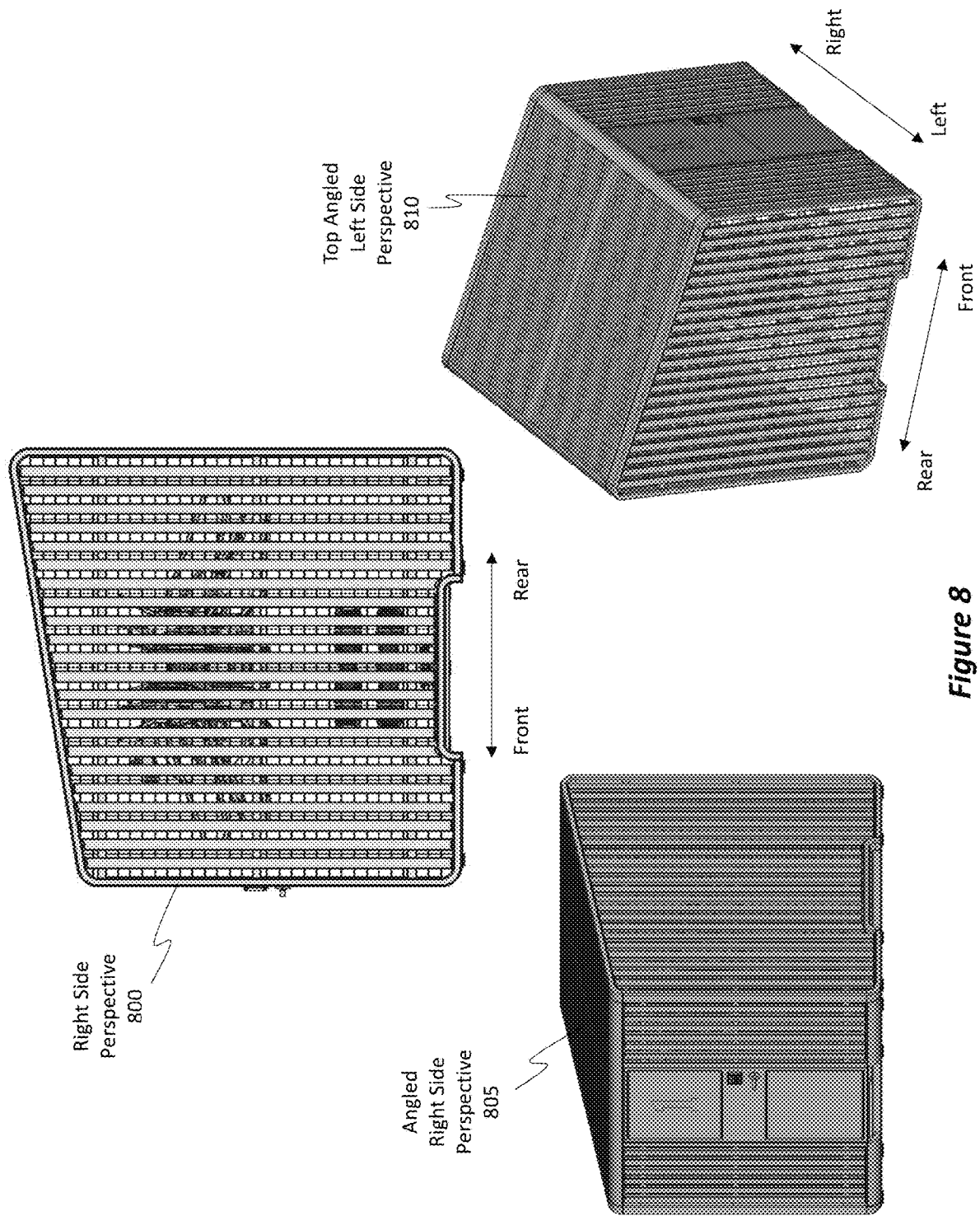
FIG. 8 illustrates different perspective views of the bicycle storage unit.

FIG. 8 shows a right side perspective 800 and an angled right side perspective 805. FIG. 8 further shows a top angled left side perspective 810.

Figure 9:
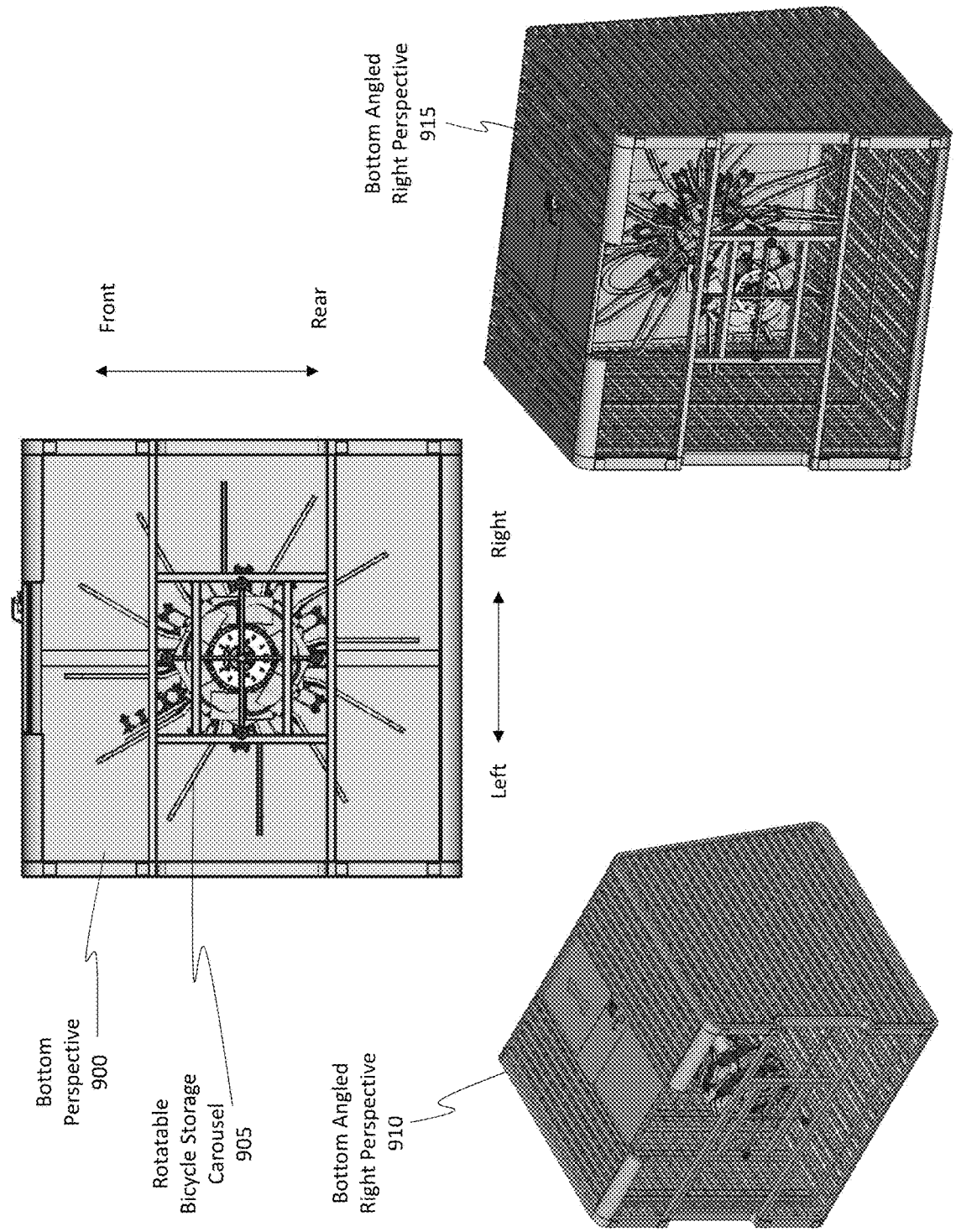
FIG. 9 illustrates different perspective views of the bicycle storage unit.

FIG. 9 shows a bottom perspective 900. From this perspective, one can partially observe the rotatable bicycle storage carousel 905. FIG. 9 further shows the bottom angled right perspective 910 and a bottom angled right perspective 915.

Some embodiments configure the side walls and roof differently. In FIGS. 6 through 9, the four side walls and the roof all had slats. Some embodiments can be configured to have one, two, three, or four walls to have slats and can or cannot configure the roof to have slats. As one example, the enclosure may have three walls with slats, one wall as a continuous wall (no slats), and the roof might have no slats.

Rotatable Bicycle Storage Carousel

Figure 10:
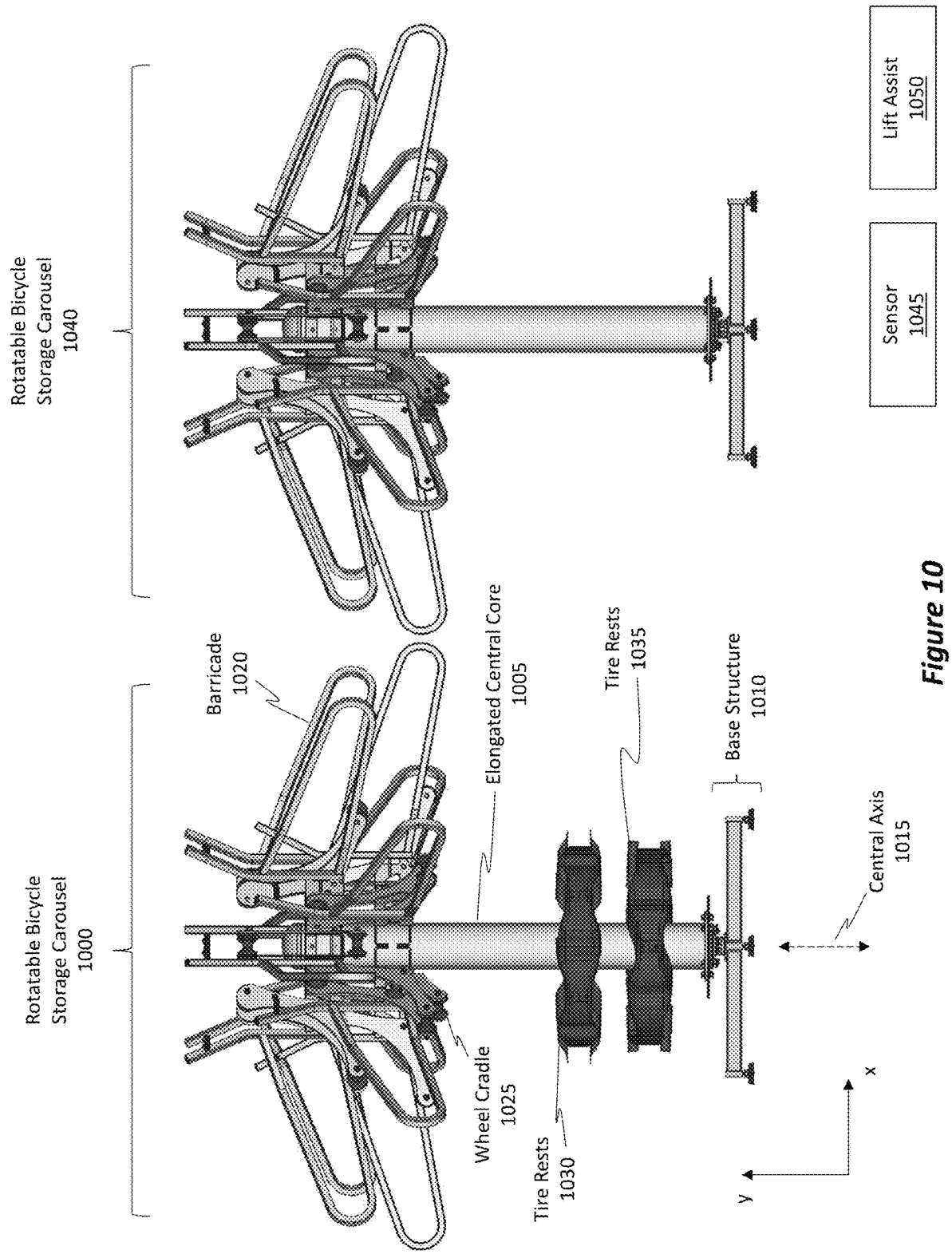
FIG. 10 illustrates an example of the rotatable bicycle storage carousel.

Attention will now be directed to FIG. 10, which illustrates an example rotatable bicycle storage carousel 1000 that can be disposed within the confines of the enclosure described previously. In some implementations, the rotatable bicycle storage carousel 1000 can be secured (e.g., via bolting or perhaps even welding) to the floor of the enclosure. In some implementations, the rotatable bicycle storage carousel 1000 can be secured (e.g., perhaps via bolting) to the ground (e.g., in scenarios where the enclosure does not have a floor). In some scenarios, the rotatable bicycle storage carousel 1000 might not be secured to the floor or ground, but the weight of the carousel may be sufficient and the base of the carousel may be sufficient such that the risk of tipping over is minimal or nonexistent.

The rotatable bicycle storage carousel 1000 is shown as including an elongated central core 1005 having a generally cylindrical shape. The elongated central core is attached to a base structure 1010 at one distal end and is attached so as to be orthogonal to a plane that is defined by the base structure 1010. As an example, if the base structure 1010 defines a plane that is parallel to the ground, then the elongated central core 1005 is perpendicular to that plane and is parallel to a gravity vector.

The elongated central core 1005 is rotatable relative to the base structure 1010. That is, the base structure 1010 remains stationary and remains in contact with either the floor or the ground (from here going forward, reference will simply be made to the floor, but one will appreciate that the base structure 1010 can contact the ground as well, such as dirt).

The elongated central core 1005 can rotate in a clockwise direction and/or in a counterclockwise direction relative to a central axis 1015 defined by the central region of the elongated central core 1005. That is, when view from an aerial perspective, the elongated central core 1005 has a central axis 1015, and the elongated central core 1005 can rotate about that central axis 1015.

Attached to the elongated central core 1005 is any number of bicycle storage assemblies. Each bicycle storage assembly includes, among other things, a barricade (e.g., barricade 1020) and a wheel cradle (e.g., wheel cradle 1025). Further details on the bicycle storage assembly will be provided later.

In some optional implementations, the rotatable bicycle storage carousel 1000 can further include tire rests, such as tire rests 1030 and 1035. Notice, these tire rests are disposed at different heights on the elongated central core 1005. As will be discussed in more detail later, the bicycle storage assemblies can also be disposed at alternating heights on the elongated central core 1005. The tire rests 1030 and 1035 are provided as rests for an opposite tire from the one that is being used to suspend the bicycle from a wheel hook (not currently labeled in FIG. 10).

In some cases, a bicycle front tire can be suspended from the wheel hook. In some cases, a bicycle rear tire can be suspended from the wheel hook. When the front tire is suspended from the wheel hook, then the bicycle rear tire will rest against one of the tire rests 1030 or 1035. When the rear tire is suspended from the wheel hook, then the bicycle front tire will rest against one of the tire rests 1030 or 1035.

FIG. 10 further shows a simplified visualization of a rotatable bicycle storage carousel 1040 without the tire rests 1030 and 1035. Subsequent figures also show the scenarios where the tire rests are not illustrated. One will appreciate, however, that the tire rests can be incorporated into any embodiment, and visualizations without tire rests are simply used in an effort to provide an unobstructed viewpoint of various portions of the carousel.

Some embodiments equip the carousel with one or more sensors, such as sensor 1045. These sensors can be optical sensors used to detect the presence or absence of a bicycle on the carousel. These sensors can be pressure or weight sensors to detect the presence or absence of a bicycle. The sensors can even include cameras.

Some embodiments further include one or more lift assists, as shown by lift assist 1050. As mentioned previously, bicycles are stored in an upright or vertical orientation on the carousel. What this means, then, is that one of the wheels of the bicycle has to be lifted off of the ground and hung from a wheel hook. Some embodiments include a spring assist or hydraulic lift assist to help with lifting the tire above the ground.

Some embodiments include a single lift assist that is disposed at a fixed position behind the door. The carousel can rotate to different positions while the lift assist remains stationary. Thus, a single lift assist can be used for multiple different bicycle storage assemblies on the carousel. Some embodiments, on the other hand, include a dedicated lift assist per bicycle storage assembly such that these lift assists are coupled to the carousel and rotate with the carousel.

When equipped with the lift assist 1050, users need only guide their bicycle to the lift assist 1050 but not fully lift the bicycle by themselves. The lift assist 1050 will help lift the bicycle for storage on a bicycle storage assembly. In some embodiments that are equipped with the lift assist 1050, the bicycles in the alternating lower positions are lifted rear-wheel first, thus allowing a simple vertical lift assist path without handlebar interference. The bicycles in the alternating upper positions are lifted front-wheel first. Instructions can be provided to the user to inform him/her regarding how to store the bicycle. These instructions can be provided via a display on the unit and/or via the user's smart device. Optionally, cameras can monitor the user's progress and can trigger and alert if the user is not properly following the instructions. As will be described in more detail later, if the bicycle is not stored in accordance with the instructions, some embodiments will prevent the door from being locked and/or the carousel from rotating.

Optionally, either the entry door or perhaps each bicycle storage assembly is structured to impose various size limits or constraints on the bicycles. If a bicycle exceeds certain specified physical dimensions, then the door or perhaps the carousel will prohibit the user from completing the storage of the bicycle in the unit. For instance, the carousel may be prohibited from rotating if the bicycle is too large. As another example, the door may not lock if the bicycle is too large.

Figure 11:
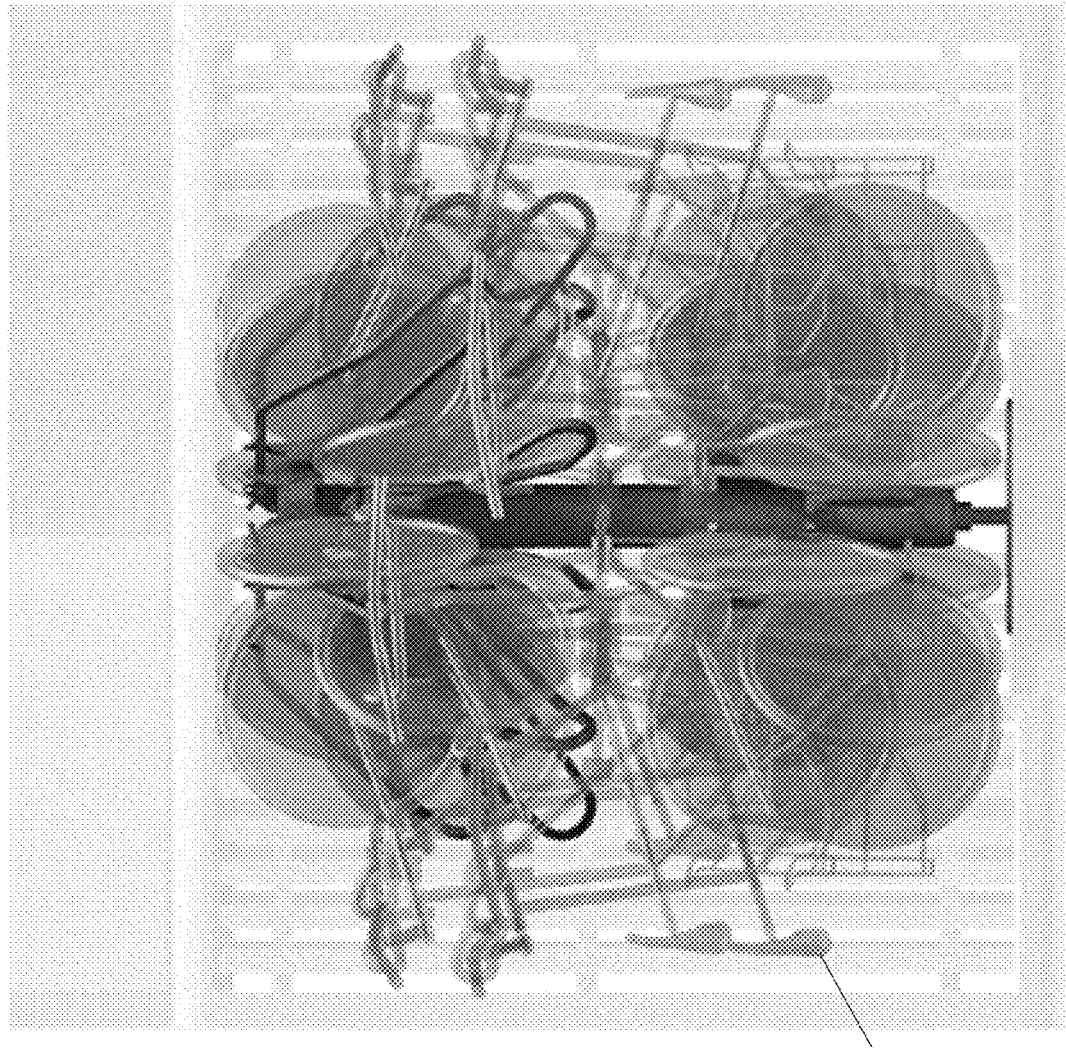
FIG. 11 illustrates how bicycles can be stored on the rotatable bicycle storage carousel.

FIG. 11 shows how bicycles can be stored on the carousel in a dense manner, as shown by dense storage 1100. Some embodiments are configured to have 12 different bicycle storage assemblies per carousel such that 12 different bicycles can be stored in a unit. Of course, different configurations can be adopted. For instance, the carousel can be equipped with anywhere from 1 bicycle storage assembly up to about 20 different bicycle storage assemblies depending on the size of the elongated central core. Normally, the carousel has 12 assemblies. The number of assemblies also corresponds to the number of bicycles that can be stacked or stored by the carousel. FIG. 11 further shows how the various bicycles have a vertical storage orientation 1105.

Figure 12:
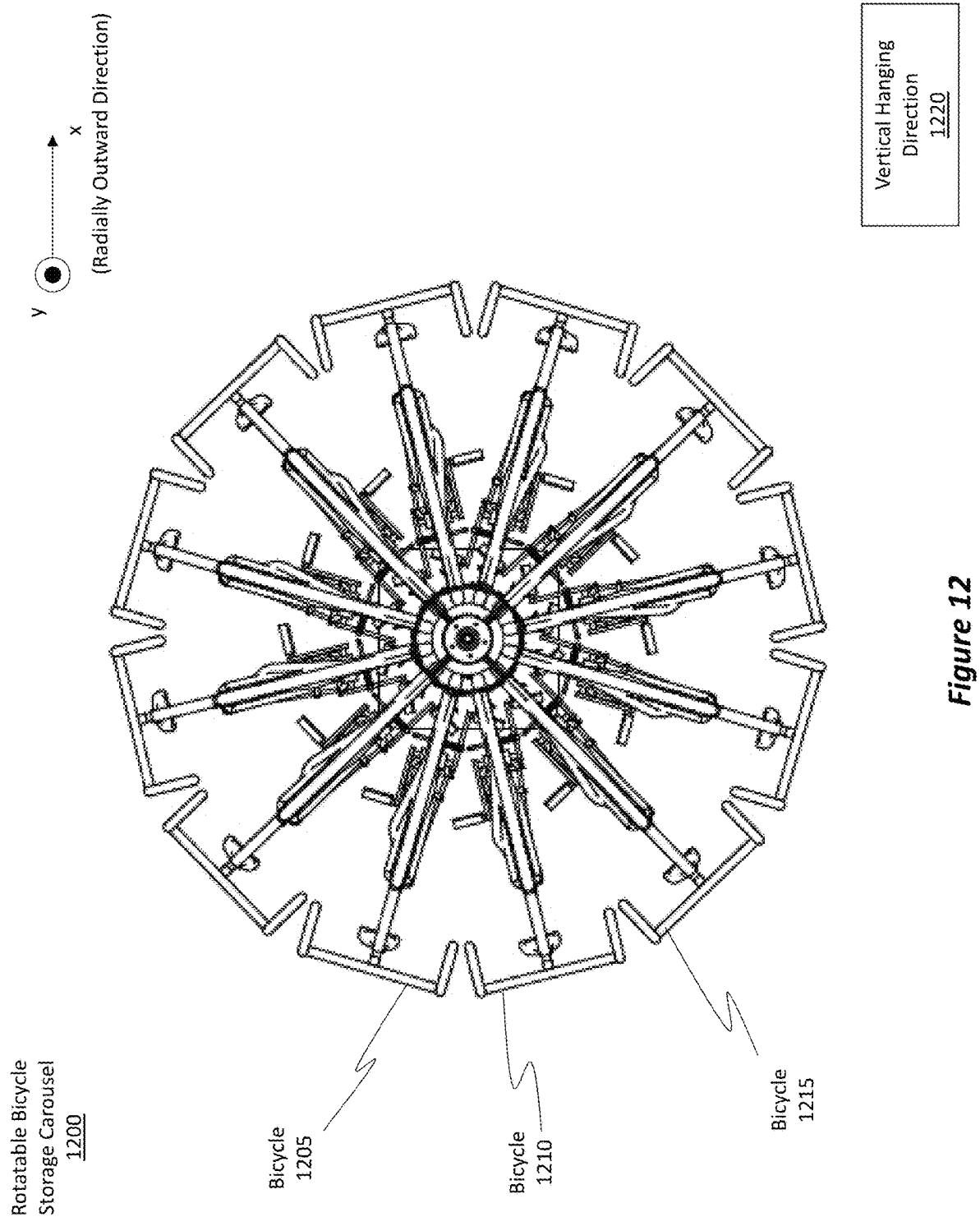
FIG. 12 illustrates a top aerial view of the rotatable bicycle storage carousel.

FIG. 12 shows a rotatable bicycle storage carousel 1200, which is representative of those discussed thus far, from an aerial perspective view or a bird's eye view. The legend shows the different directions. The circle with the dark dot is the "Y" direction and is out of the page. The arrow pointing to the right is the "X" direction and is a direction that is radially outward relative to the central axis of the elongated central core.

This carousel is equipped with 12 bicycle storage assemblies such that 12 different bicycles can be stored thereon. FIG. 12 has three bicycles labeled, as shown by bicycle 1205, bicycle 1210, and bicycle 1215. Notice, the 12 different bicycles are currently stored in a vertical hanging direction 1220, which is a direction that is orthogonal to a plane defined by the base structure. Subsequent illustrations better illustrate this aspect.

Figure 13:
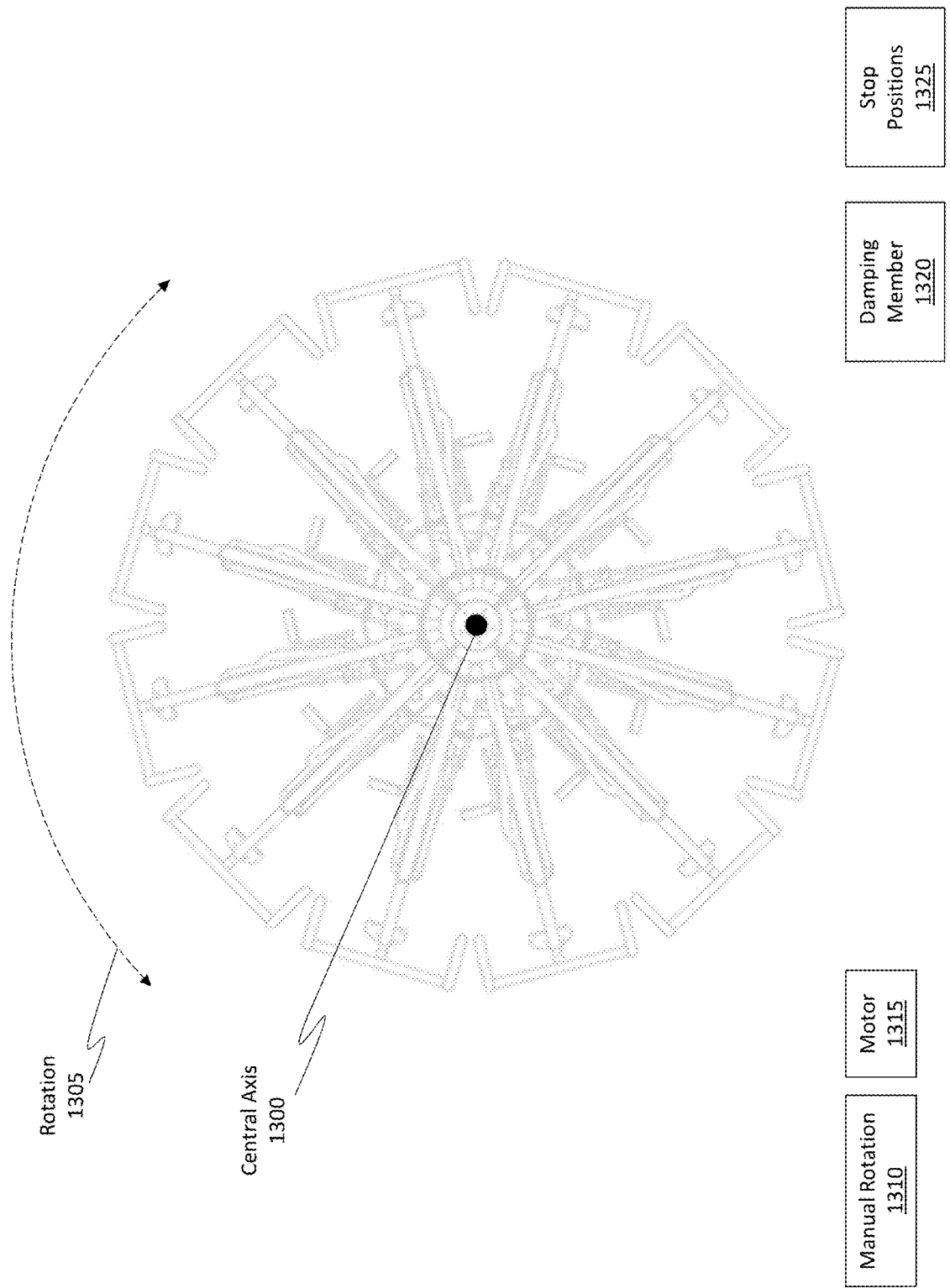
FIG. 13 illustrates the rotation abilities of the rotatable bicycle storage carousel.

FIG. 13 shows the central axis 1300, which is representative of the central axis 1015 from FIG. 10. The carousel is rotatable relative to the central axis 1300, as shown by the rotation 1305. The rotation 1305 can be a clockwise rotation and/or a counterclockwise rotation.

Some embodiments are configured to allow for a manual rotation 1310 of the carousel. For instance, some embodiments can include a grabbable disc or portion that can extend partially outside of the enclosure. A user can grip this portion and use it to rotate the carousel about the central axis 1300.

Some embodiments are configured to include an electric motor 1315 that allows for the automatic rotation of the carousel. The motor 1315 can be controlled via electronics integrated with the carousel and/or can be controlled via a cloud service. Further details on this aspect will be provided later.

As will also be discussed in more detail later, the carousel can be equipped with a damping member 1320 structured to slow a momentum or velocity of the spinning speed of the carousel. This damping member 1320 is provided to protect against the scenario where the carousel is spun too rapidly, thereby potentially damaging the bicycles. The carousel can also be equipped with a number of stop positions 1325 and a stop unit. The number of stop positions 1325 corresponds to the number of bicycle storage assemblies and thus corresponds to the number of bicycles the carousel can support. The stop positions enable the carousel to stop in its rotation at a desired location relative to the enclosure's lockable door. For instance, the stop positions are located so that the carousel will stop when a bicycle storage assembly is presented immediately before the lockable door.

Figure 14:
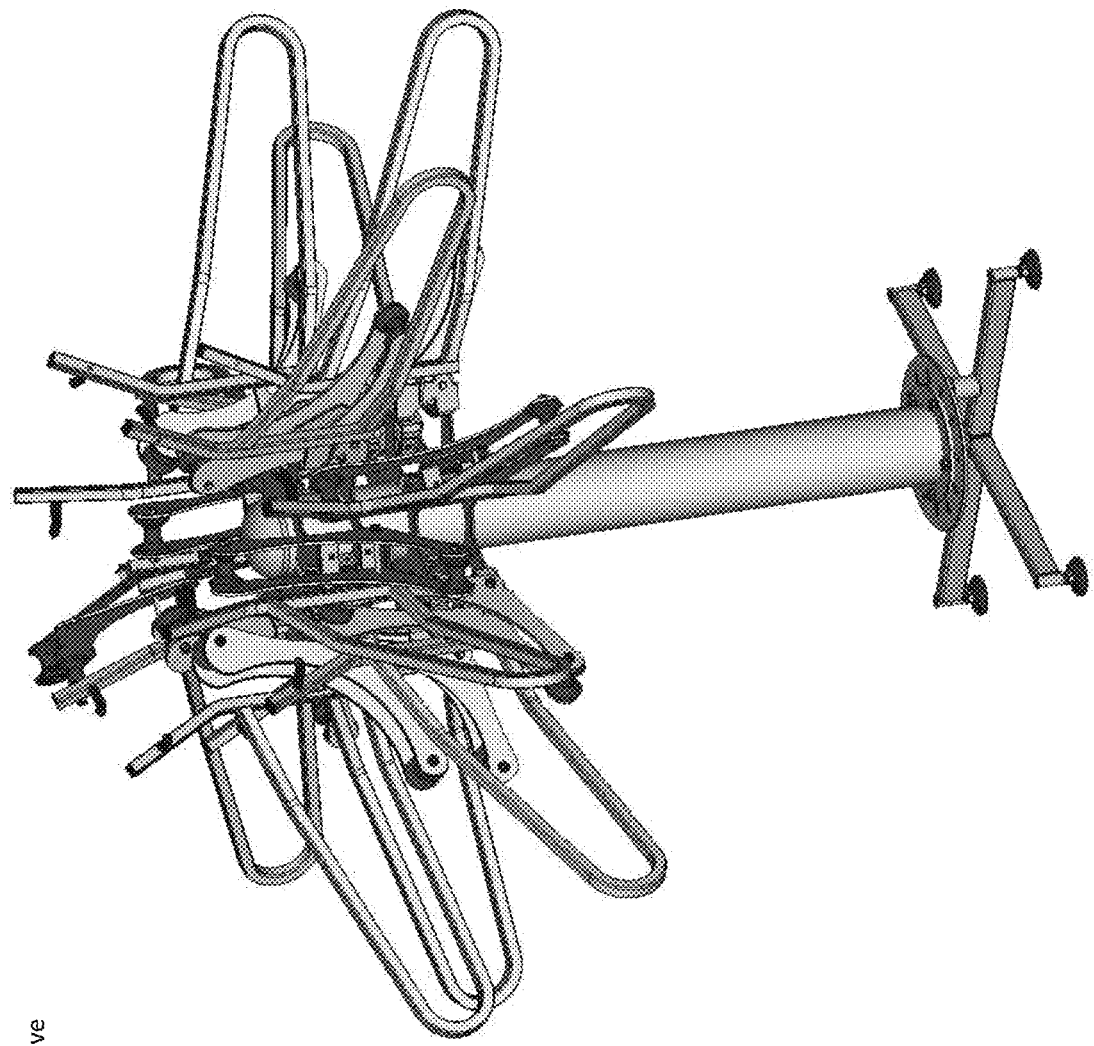
FIG. 14 illustrates an angled perspective view of the rotatable bicycle storage carousel.

FIG. 14 shows an angled perspective 1400 of the carousel.

Figure 15:
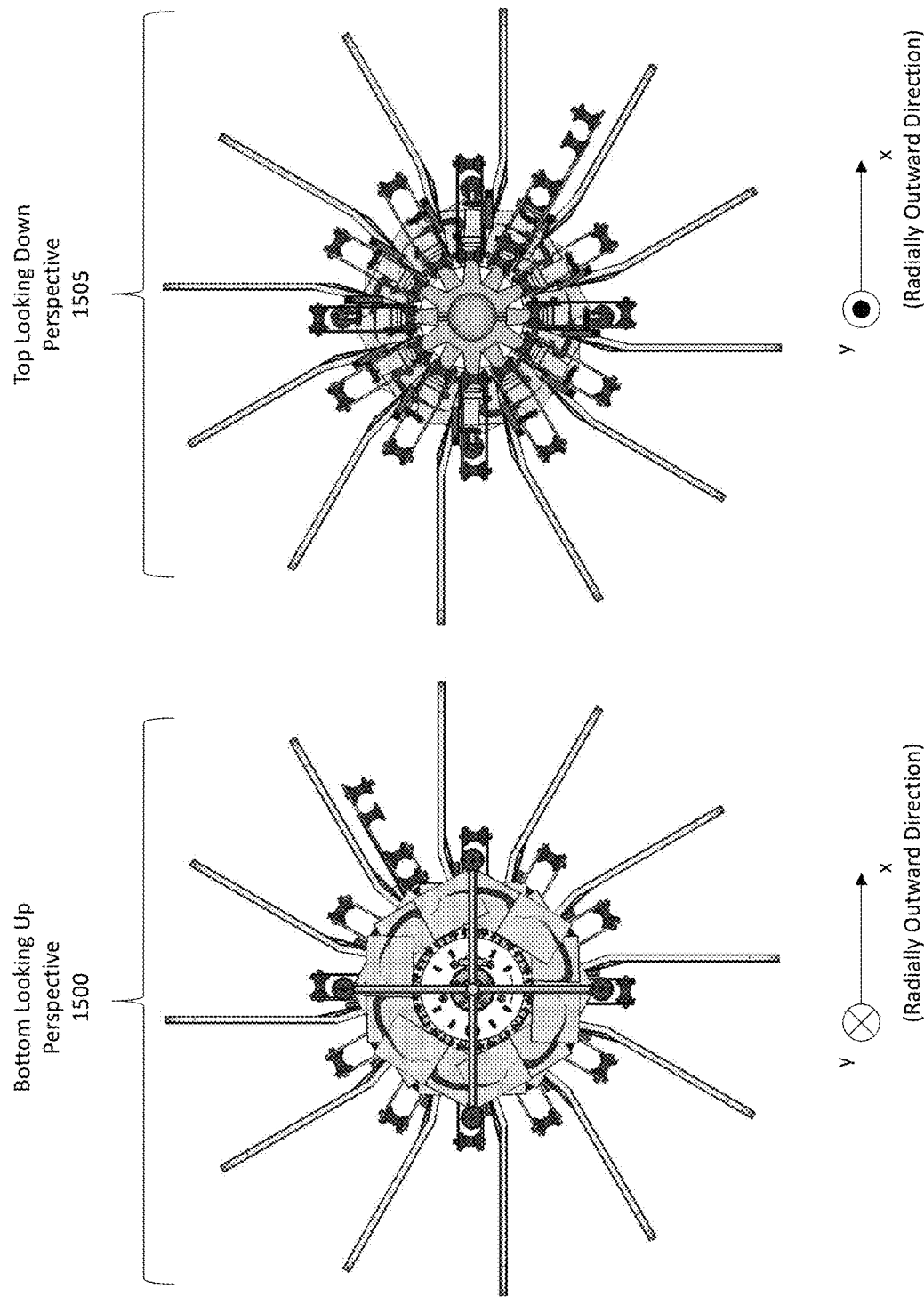
FIG. 15 illustrates a bottom looking up and a top looking down perspective view of the rotatable bicycle storage carousel.

FIG. 15 shows a bottom looking up perspective 1500. The legend shows how the circle with the "X" reflects that the elongated central core is extending into the page. FIG. 15 further shows a top looking down perspective 1505. The legend shows how the circle with the dark circle reflects that the elongated central core is extending out of the page.

Figure 16:
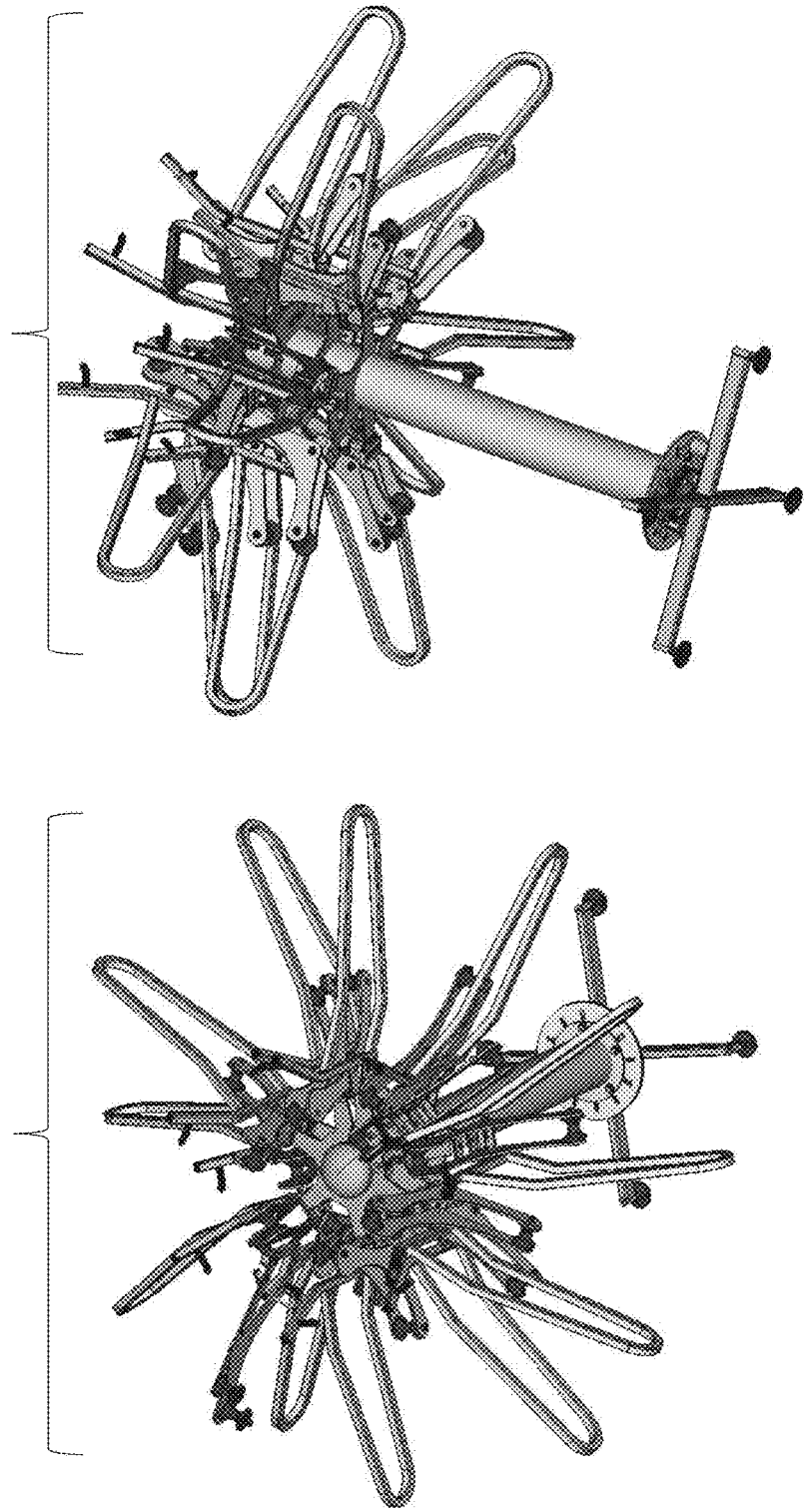
FIG. 16 illustrates different perspective views of the rotatable bicycle storage carousel.

FIG. 16 shows a top angled perspective 1600. FIG. 16 further shows a bottom angled perspective 1605.

Simplified Views

Figure 17:
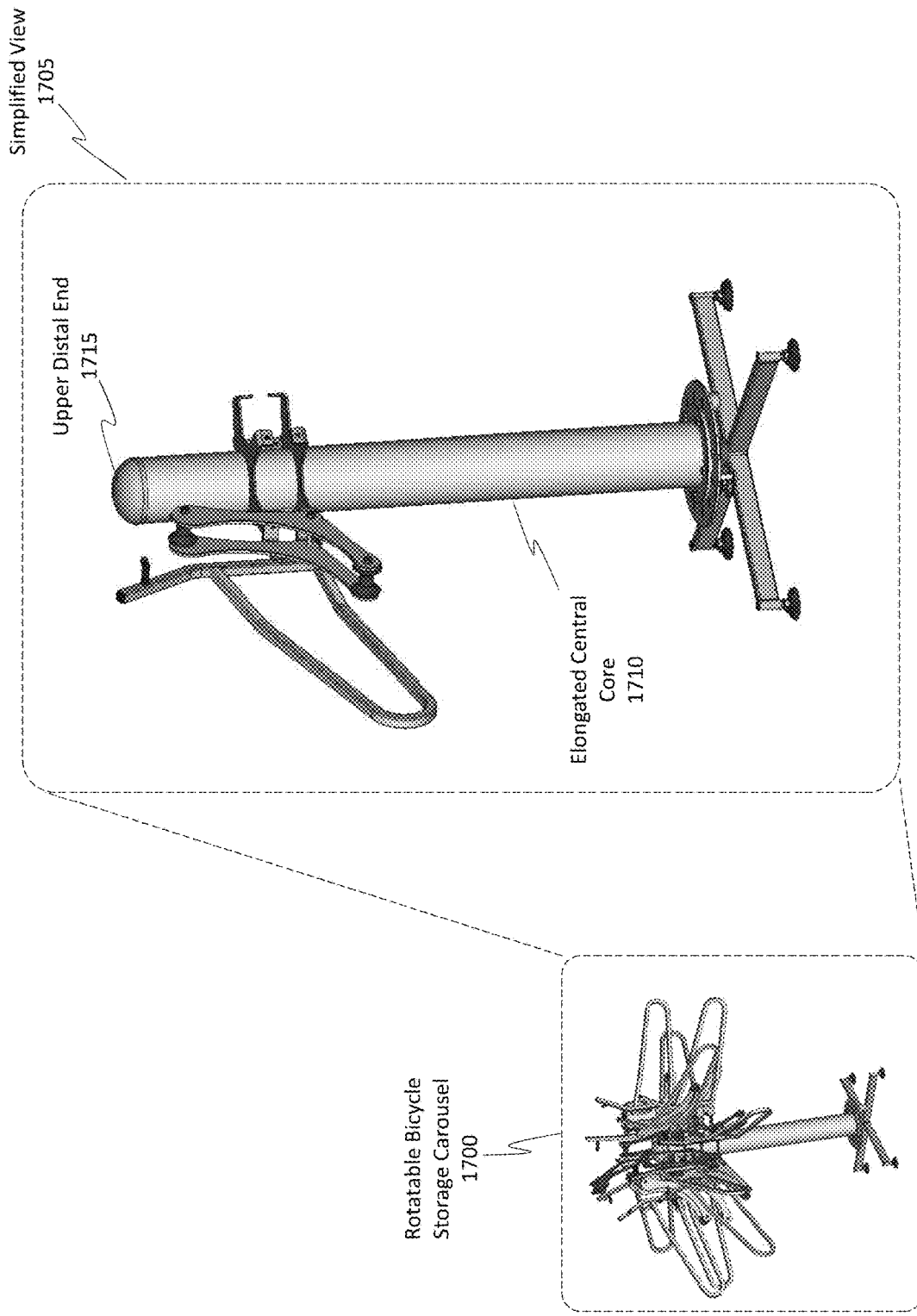
FIG. 17 illustrates a simplified view of the rotatable bicycle storage carousel, where various portions of the rotatable bicycle storage carousel have been removed so as to facilitate an improved understanding as to the workings and functionality of the rotatable bicycle storage carousel.

FIG. 17 shows a rotatable bicycle storage carousel 1700 in accordance with the disclosed principles and a simplified view 1705 of the rotatable bicycle storage carousel 1700 where most of the bicycle storage assemblies have been removed and where only a single bicycle storage assembly is now visible. With this simplified view, one can observe the elongated central core 1710 and the upper distal end 1715 of the elongated central core 1710. The upper distal end 1715 will be a reference point for some of the subsequent figures to assist in determining what perspective view is being provided in the figure.

Figure 18:
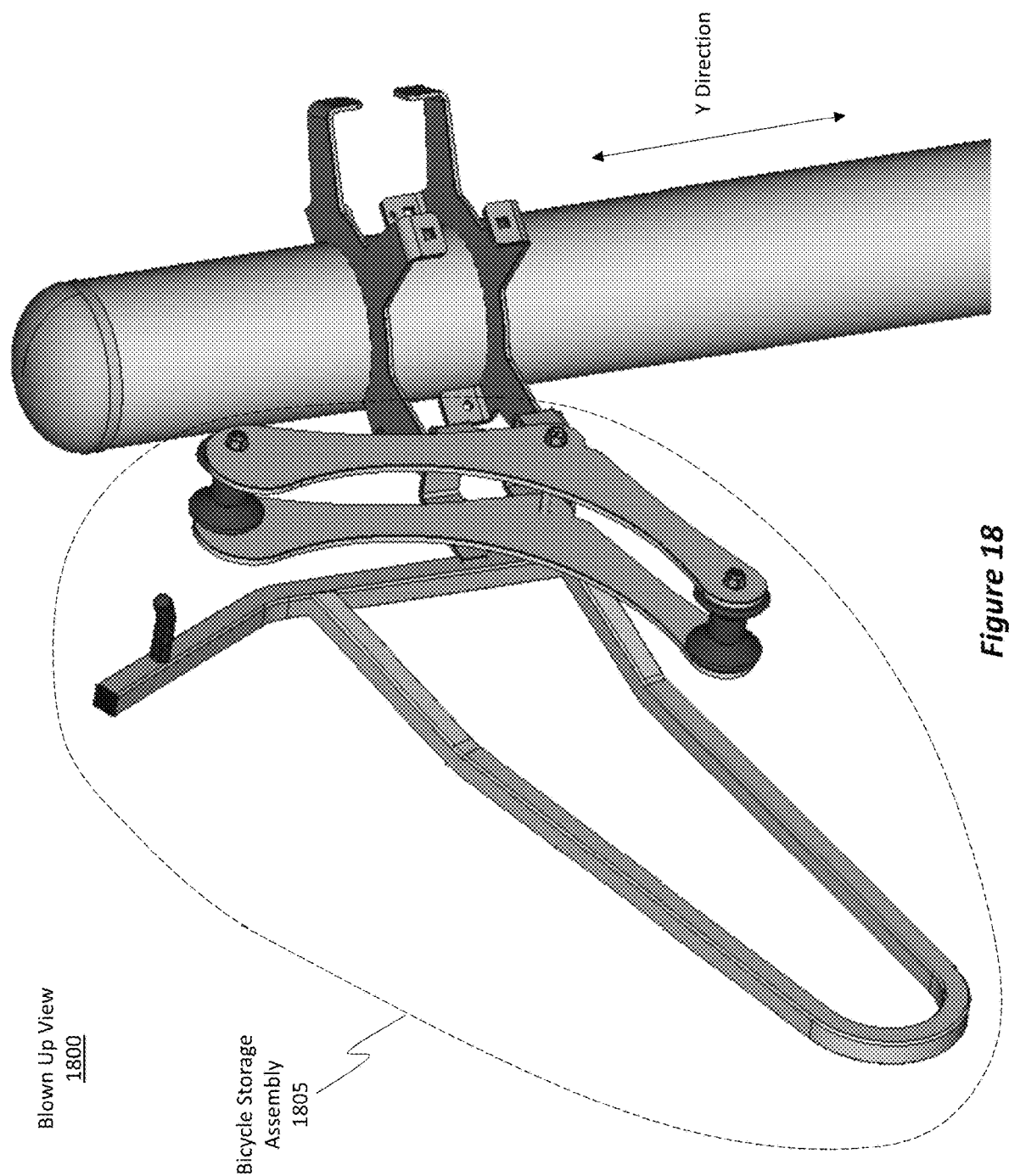
FIG. 18 illustrates a blown up view of the simplified version of the rotatable bicycle storage carousel.

FIG. 18 shows a blown up view 1800 of a portion of the representation that was shown in FIG. 17. FIG. 18 also shows the "Y" direction, which runs parallel to the elongated central core. FIG. 18 primarily shows a close up of a bicycle storage assembly 1805, which is used to hang or store a bicycle.

Figure 19:
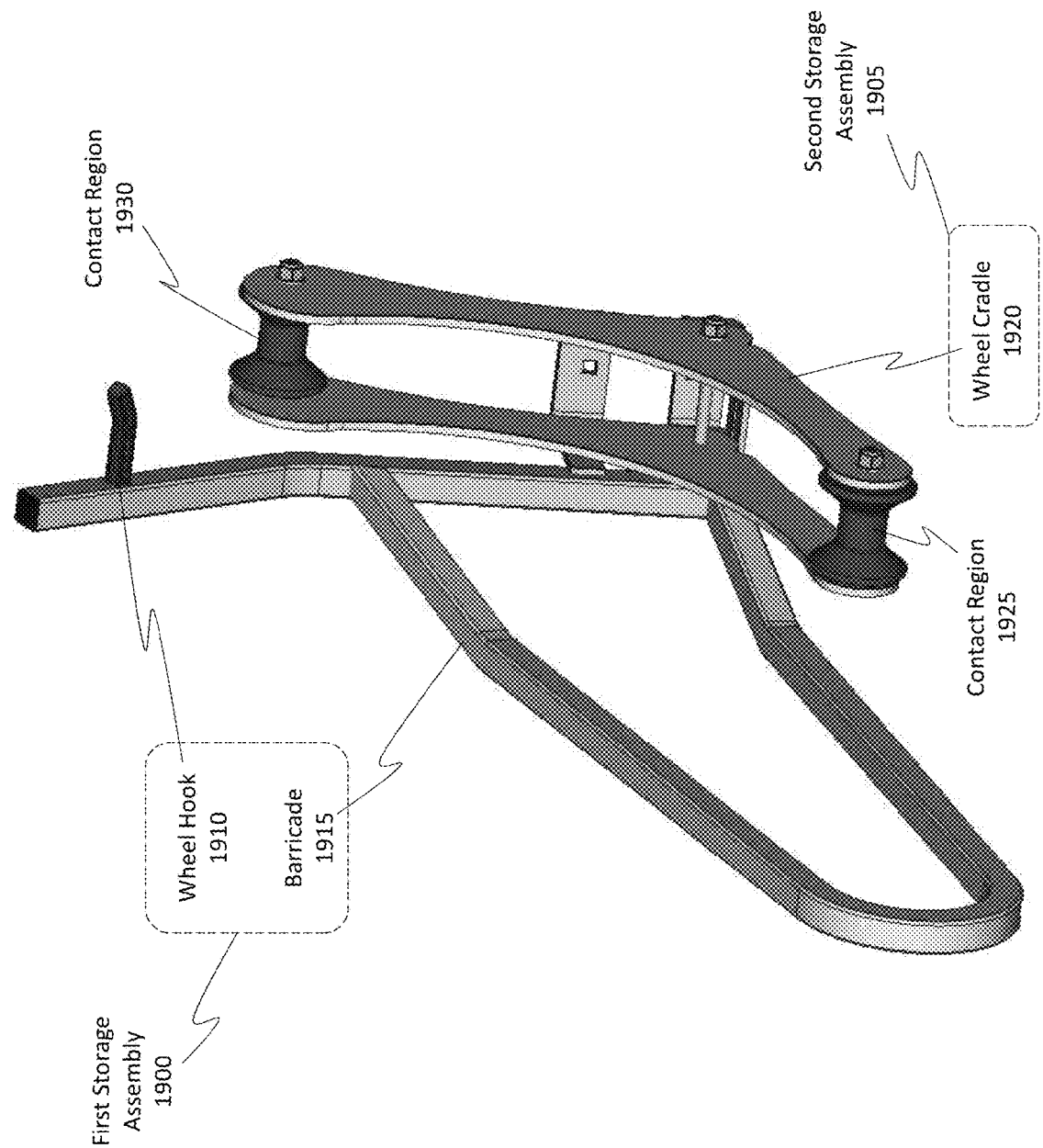
FIG. 19 illustrates the various assemblies that are included in the rotatable bicycle storage carousel.

FIG. 19 describes some of the features of the bicycle storage assembly 1805 of FIG. 18. In particular, a bicycle storage assembly includes a first storage assembly 1900 and a second storage assembly 1905.

The first storage assembly 1900 includes a wheel hook 1910, which is used to hang a bicycle tire. The first storage assembly 1900 further includes a barricade 1915, which is provided to block or impede a user's access to adjacently stored bicycles. That is, the barricade 1915 prevents the user from being able to extract a bicycle that is hung on a different, or adjacent, bicycle storage assembly.

In some cases, the barricade is larger and can extend at least a majority of the length of a bicycle, from top to bottom. For instance, the barricade can, in some implementations, be a wall-like structure that is approximately 4 ft to 8 ft in height and approximately 1 ft to 3 ft in width (width being a dimension along the "X" dimension mentioned previously). This wall can prevent users from reaching over to adjacently hung bicycles. In some cases, the barricade might not be a wall but it can still extend in height from about 4 ft to 8 ft. In some cases, a wire mesh can be provided to cover any open areas that may be formed by the barricade. For instance, in FIG. 19, the barricade 1915 includes an empty region in the middle area. Some embodiments provision a wire mesh or some other kind of barrier in this region to further prevent a user's access to adjacently located bicycles.

The wheel hook 1910 can include a generally flat section and then an angled section near a terminal end of the wheel hook 1910. In some cases, the wheel hook 1910 can have a more hook-like appearance.

The second storage assembly 1905 includes a wheel cradle 1920. The wheel cradle 1920 includes a first contact region 1925 and a second contact region 1930. The two contact regions cradle or support the bicycle tire, meaning that both of these contact regions are in contact with the bicycle tire. Thus, there are typically at least four points of contact between a bicycle and the rotatable bicycle storage carousel. These four points of contact include a contact with the wheel hook 1910, a contact with the contact region 1925, a contact with the contact region 1930, and a contact with one of the tire rests 1030 or 1035 from FIG. 10.

The wheel cradle 1920 is disposed underneath the wheel hook 1910 in the "Y" direction. The contact region 1925 is further removed from the elongated central core relative to the contact region 1930 in the "X" direction (i.e. the radially outward direction). That is, the contact region 1925 is disposed at a location farther away from the elongated central core as compared to a location where the contact region 1930 is disposed.

Figure 20:
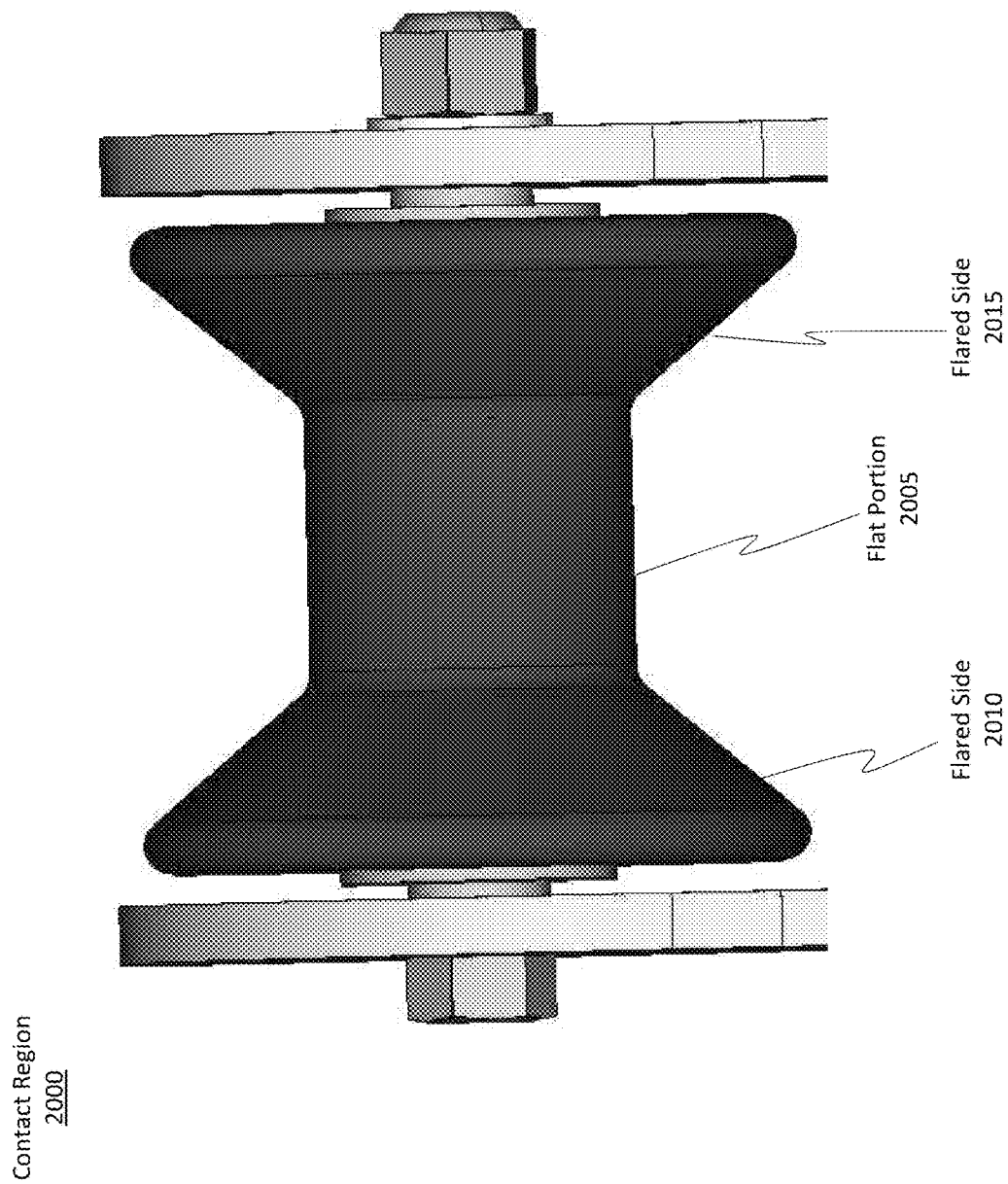
FIG. 20 illustrates a portion of the cradle that is included as a part of the rotatable bicycle storage carousel.

FIG. 20 shows a contact region 2000, which is representative of any one of the contact regions 1925 or 1930 from FIG. 19. In some embodiments, the contact region 2000 includes a relatively flat portion 2005, a first flared side 2010, and a second flared side 2015. That is, the contact region 2000 includes a flat portion 2005 located between two flared sides 2010 and 2015 such that a bicycle tire can be at least partially cradled along an outer perimeter portion of the bicycle tire by the flat portion 2005 and along outer wall portions of the bicycle tire by the two flared sides 2010 and 2015. Stated differently, depending on the size of the tire, the contact region 2000 can contact the tire along multiple different dimensions.

Figure 21:
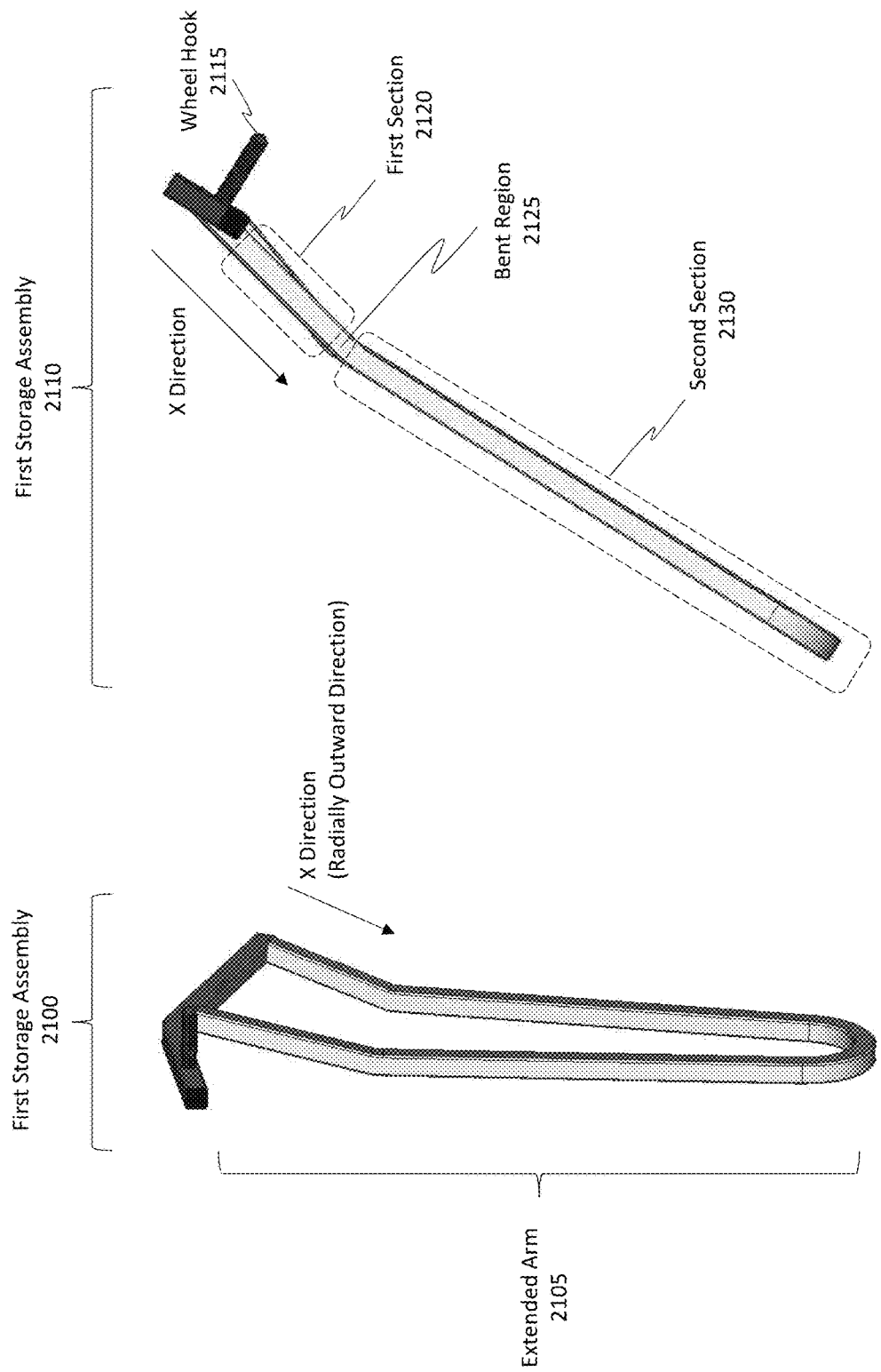
FIG. 21 illustrates various perspective views of the first storage assembly of the rotatable bicycle storage carousel.

FIG. 21 more fully illustrates the first storage assembly 2100. The first storage assembly 2100 includes an extended arm 2105 (i.e. the barricade), which acts as a barricade between adjacently located bicycle storage assemblies. Notice, the extended arm 2105 includes a discrete bend. Starting from a point of contact near the elongated central core, the extended arm 2105 extends outwardly in the "X" direction until reaching the bent region. Then, the extended arm 2105 continues to extend but now extends in a direction that is non-parallel (i.e. angled) relative to the "X" direction.

FIG. 21 shows a different perspective view, as shown by the first storage assembly 2110. From this perspective, one can observe how the wheel hook 2115 is attached or coupled to the extended arm. The extended arm includes a first section 2120 that extends radially outward from the elongated central core in the "X" direction. The extended arm further includes a bent region 2125, which causes the second section 2130 of the extended arm to be angled relative to the "X" direction. The bent region 2125 is located at a terminal end of the first section 2120. In cases where the barricade is in the form of the wall mentioned earlier, the wall can also have a bend to it.

Figure 22:
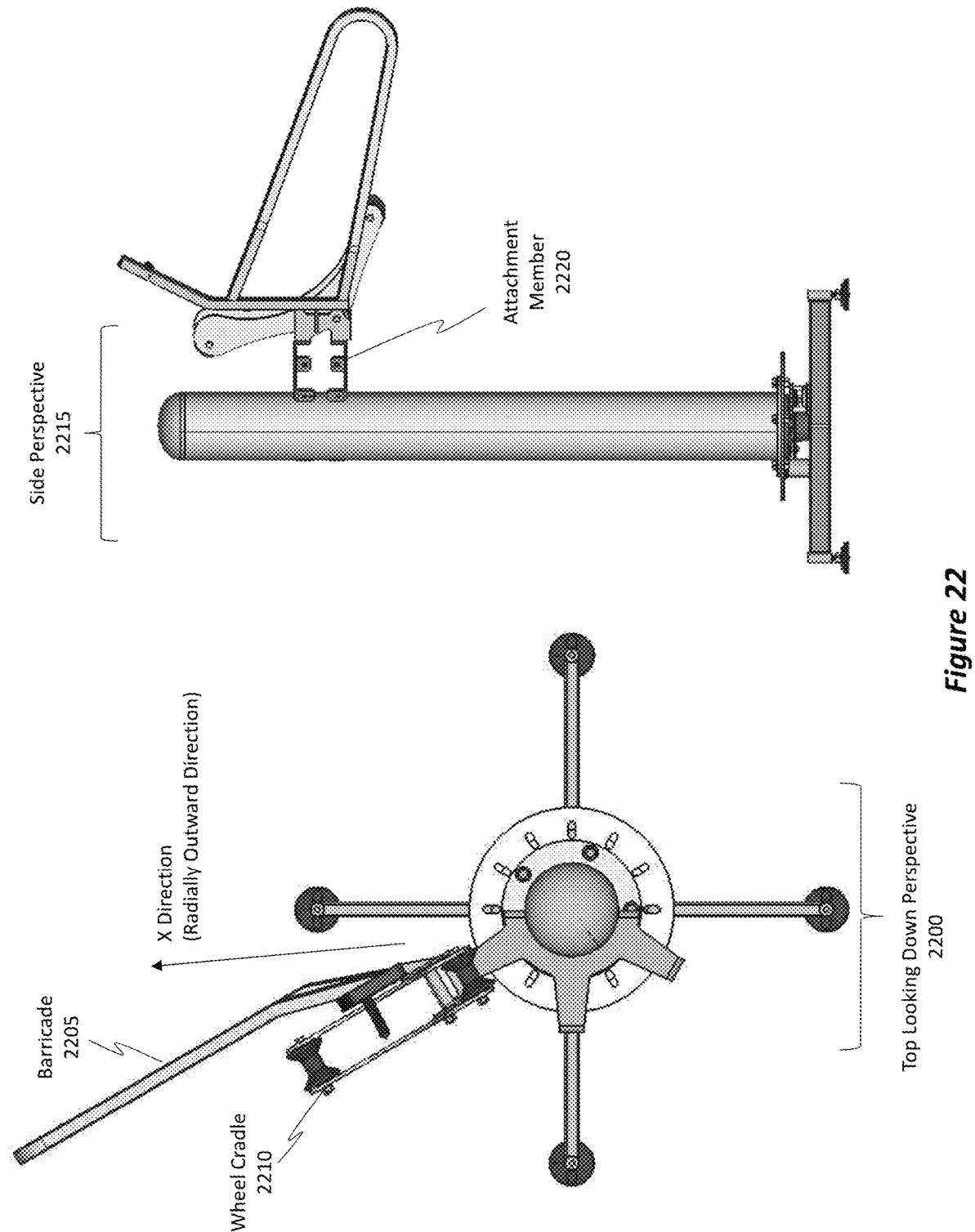
FIG. 22 illustrates various perspective views of the bicycle storage assembly.

FIG. 22 shows some additional perspectives. FIG. 22 shows a top looking down perspective 2200, which allows one to readily observe the barricade 2205 (comprising the extended arm mentioned in FIG. 21). Notice, the first section of the barricade 2205 extends in the "X" direction, but the second section of the barricade 2205 extends in a direction that is non-parallel relative to the "X" direction. FIG. 22 also shows the wheel cradle 2210.

A side perspective 2215 is also shown. From this side perspective 2215, one can observe an attachment member 2220 that is structured to couple the bicycle storage assembly, which includes the barricade 2205, the wheel hook, and the wheel cradle 2210, to the elongated central core. The attachment member 2220 is sized to enable the bicycle storage assembly to be a determined distance away from the elongated central core. This distance can be anywhere from 1 inch up to about 10 inches away from the elongated central core. In some embodiments, the distances can vary for different bicycle storage assemblies. For instance, a first bicycle storage assembly may be 4 inches away from the elongated central core while a second bicycle storage assembly may be 8 inches away from the elongated central core. In some embodiments, the distances are uniform for all bicycle storage assemblies on a given unit.

Figure 23:
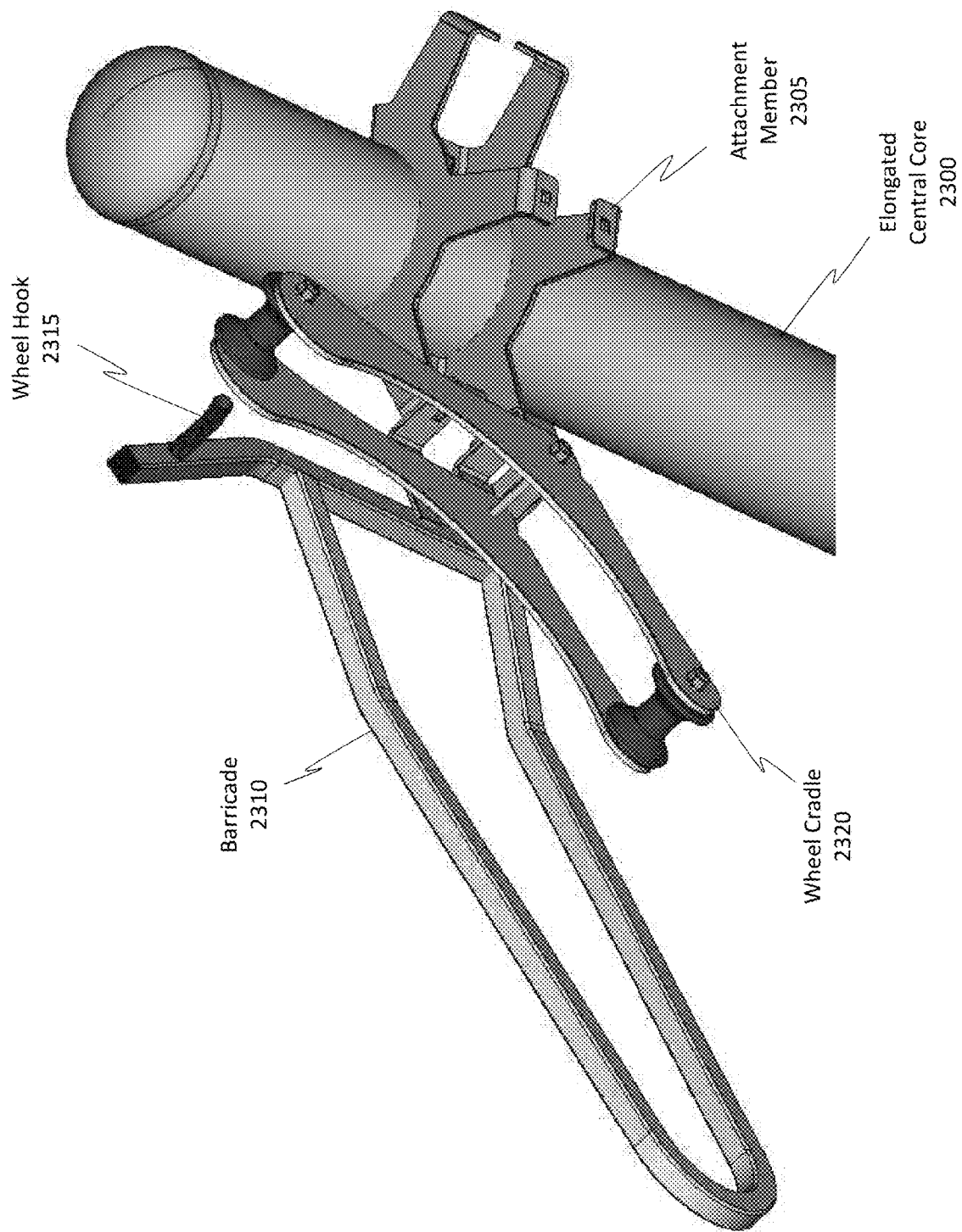
FIG. 23 illustrates a perspective view of the bicycle storage assembly.

FIG. 23 shows another perspective, which illustrates the elongated central core 2300 and the attachment member 2305. The barricade 2310, wheel hook 2315, and wheel cradle 2320 are also observable.

Figure 24:
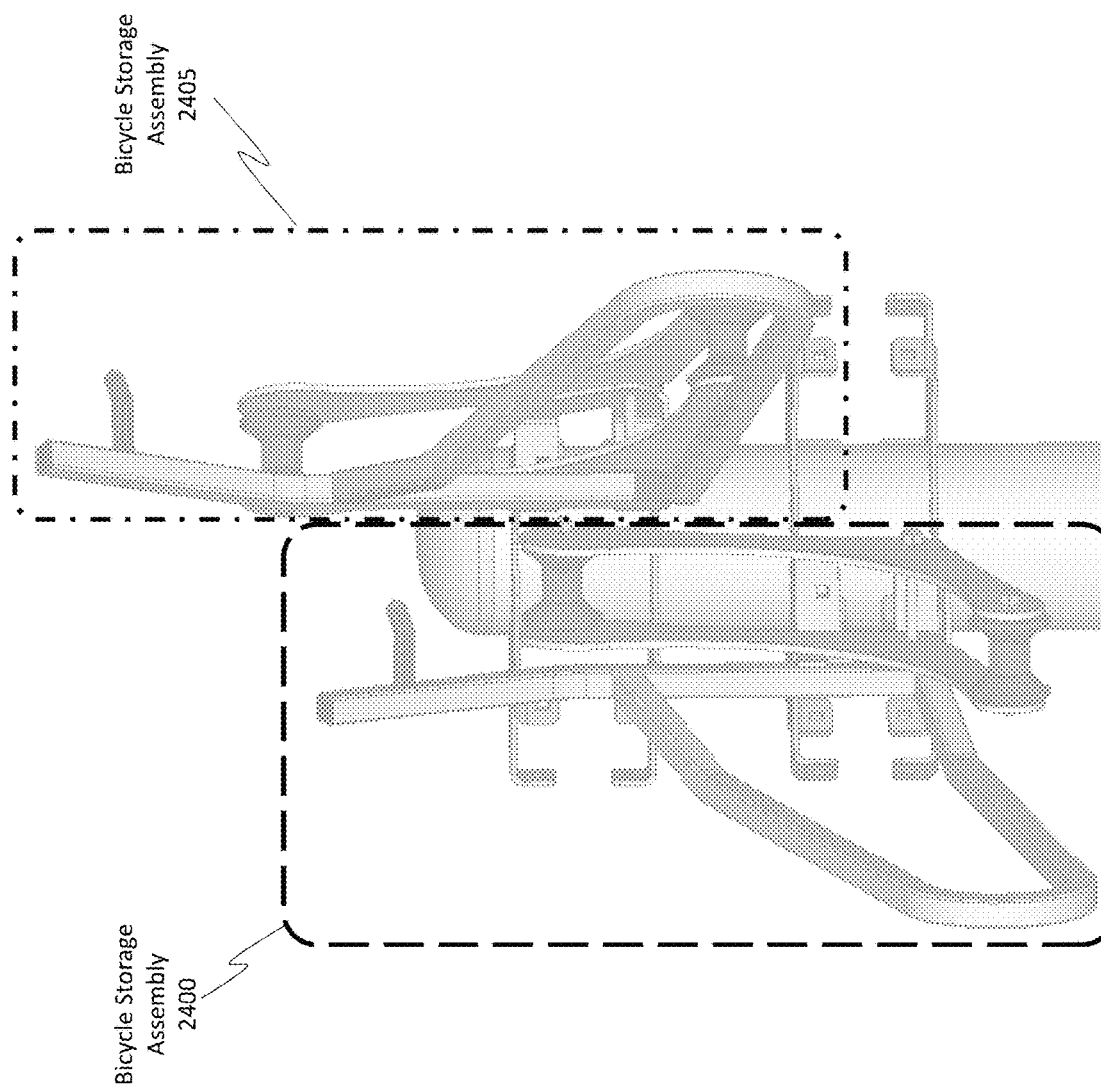
FIG. 24 illustrates another perspective view of different bicycle storage assemblies.

FIG. 24 shows a first bicycle storage assembly 2400 and a second bicycle storage assembly 2405. Often, it is the case that the rotatable bicycle storage carousel includes 12 different bicycle storage assemblies. From FIG. 24, one can also observe how the bicycle storage assemblies can be disposed on the elongated central core at alternating or varying heights relative to one another. That is, the bicycle storage assemblies are attached to the elongated central core at alternating heights relative to one another.

Figure 25:
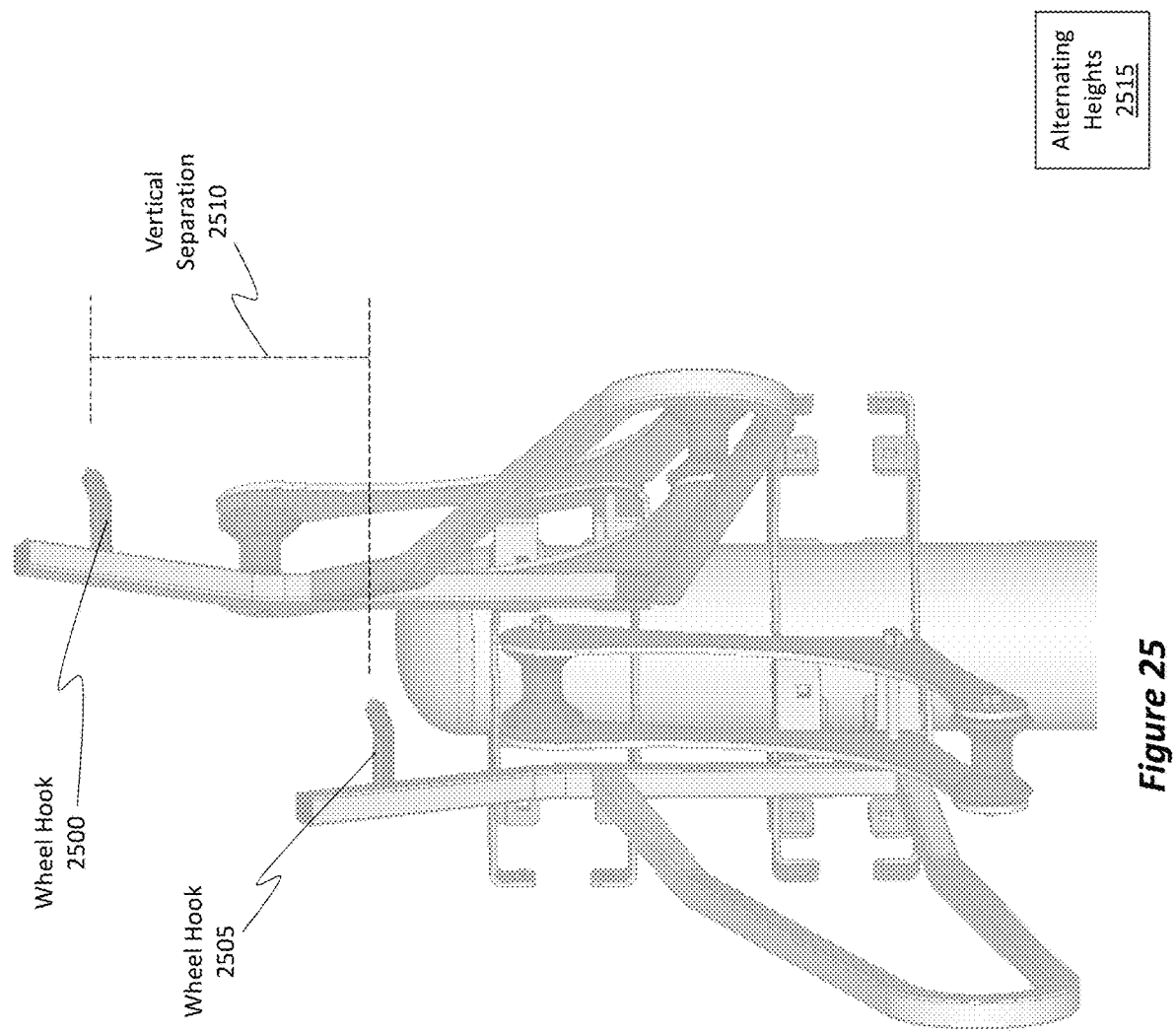
FIG. 25 illustrates another perspective view of different bicycle storage assemblies.

To illustrate, FIG. 25 shows the wheel hook 2500 of the bicycle storage assembly 2405 from FIG. 24, and the wheel hook 2505 from the bicycle storage assembly 2400. FIG. 25 also notes a vertical separation 2510 (e.g., in the "Y" direction) that exists between the wheel hooks 2500 and 2505. This vertical separation 2510 is provided to help mitigate scenarios where bicycle parts from one bicycle might collide or otherwise obstruct another bicycle hanging on the carousel. That is, by alternating their storage heights, there is a lesser likelihood that bicycles will obstruct one another.

For instance, by hanging the bicycles at alternating heights, the pedals and handlebars from one bicycle likely will not come in contact with the pedals and handlebars of an adjacent bicycle. In this manner, then, the bicycles can be hung at alternating heights 2515. In some cases, the vertical separation distance between the alternating heights of the bicycle storage assemblies is anywhere between about 6 inches to 12 inches. In some cases, the separation distance is between 8 inches and 10 inches.

Figure 26:
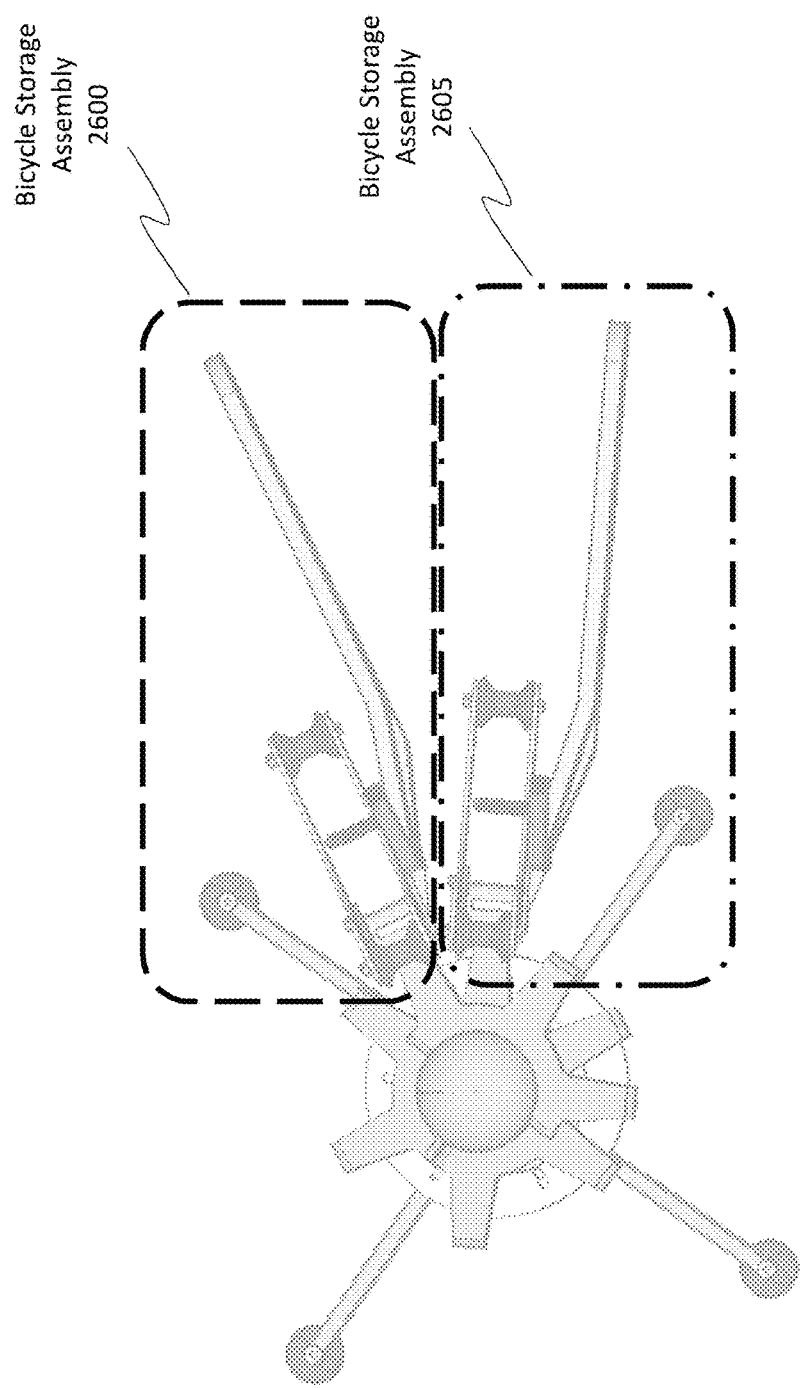
FIG. 26 illustrates another perspective view of different bicycle storage assemblies.

FIG. 26 shows the carousel from another aerial perspective. FIG. 26 further shows a first bicycle storage assembly 2600 and a second bicycle storage assembly 2605. These assemblies are connected to the elongated central core via various attachment members, as described previously. In some cases, a single attachment member can be used to attach multiple bicycle storage assemblies to the elongated central core. As mentioned previously, it is often the case that there are 12 bicycle storage assemblies connected to the elongated central core.

From FIG. 26, one can also observe how the barricade for each bicycle storage assembly operates to block or hinder access to an adjacent bicycle storage assembly and thus to an adjacently hanging bicycle. The barricade thus provides an enhanced level of security when storing bicycles on the carousel. As was mentioned previously and as will be described in more detail later, the embodiments are able to restrict the rotation of the carousel so that only a specific user's bicycle is presented before the door when the door is attempting to be opened by the user. This restriction, when coupled with the security provided by the barricade, provides enhanced security measures to help protect bicycles from theft.

Stop Positions and Rotation Dampening

FIGS. 27, 28, 29, 30, and 31 provide further details on the stop position features and the dampening features of the disclosed embodiments.

Figure 27:
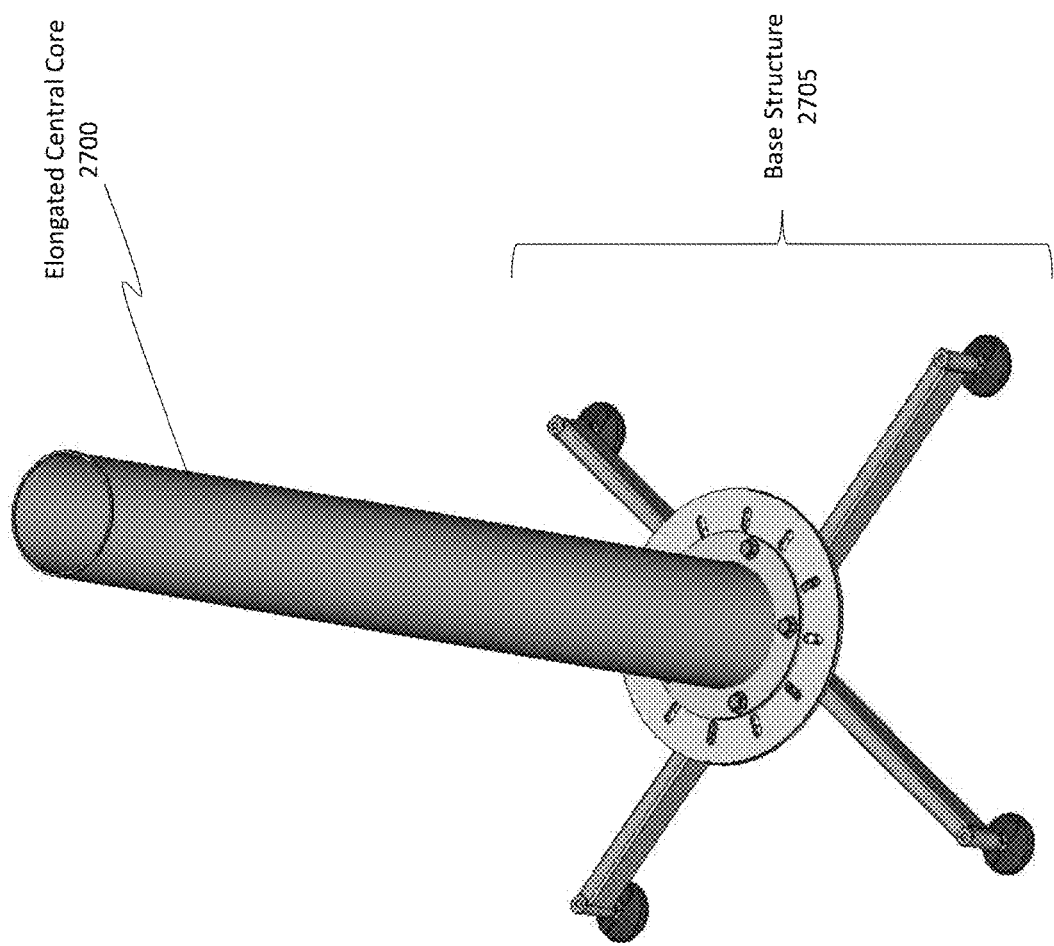
FIG. 27 illustrates the elongated central core and the base structure of the rotatable bicycle storage carousel.

FIG. 27 shows the elongated central core 2700 and the base structure 2705. Notice, in this figure, all of the bicycle storage assemblies have been stripped from the elongated central core 2700. This stripping was performed to provide an unobstructed viewpoint of the elongated central core 2700.

Figure 28:
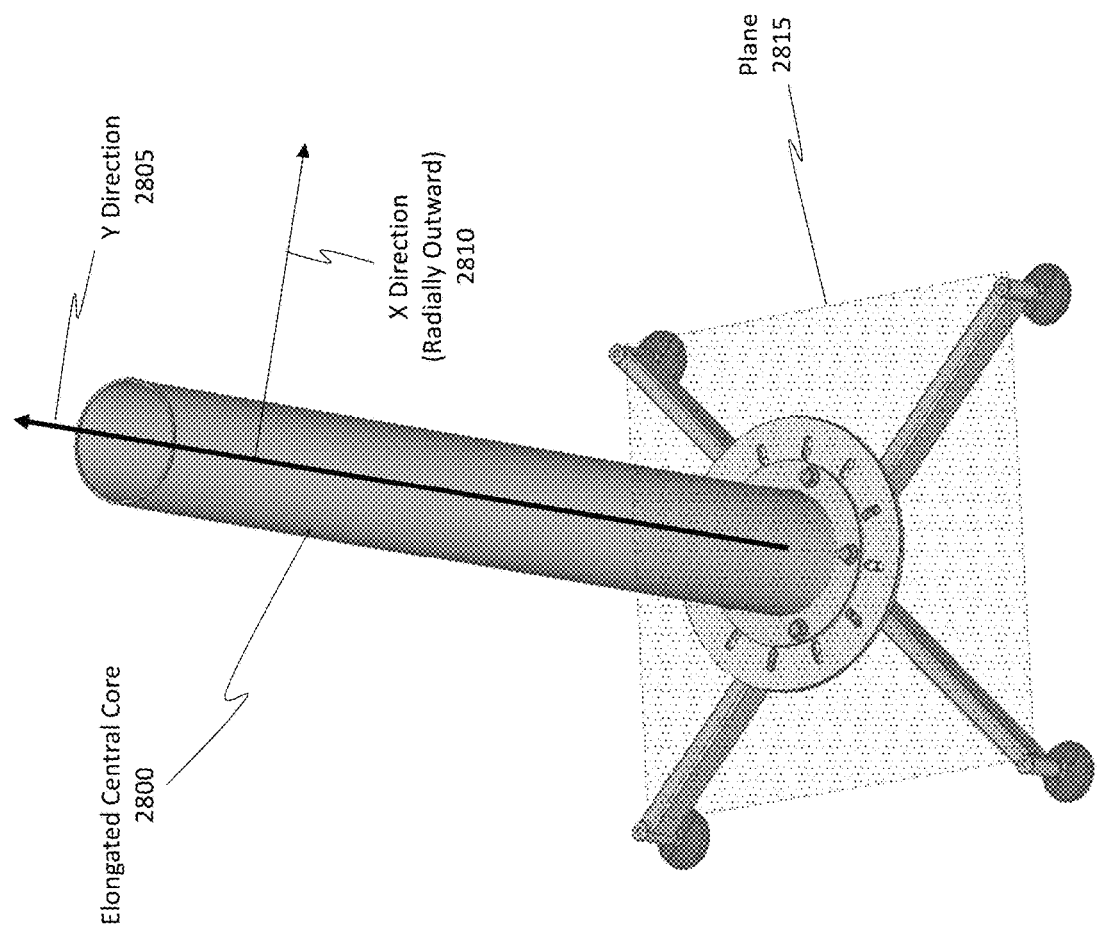
FIG. 28 provides another illustration of the elongated central core and the base structure of the rotatable bicycle storage carousel.

FIG. 28 again shows the elongated central core 2800. FIG. 28 also shows the "Y" direction 2805 and the "X" direction 2810, which extends radially outward relative to the "Y" direction 2805 and the elongated central core 2800.

The base structure is also shown as defining a plane 2815. The plane 2815 is orthogonal relative to the "Y" direction 2805 and the elongated central core 2800.

Figure 29:
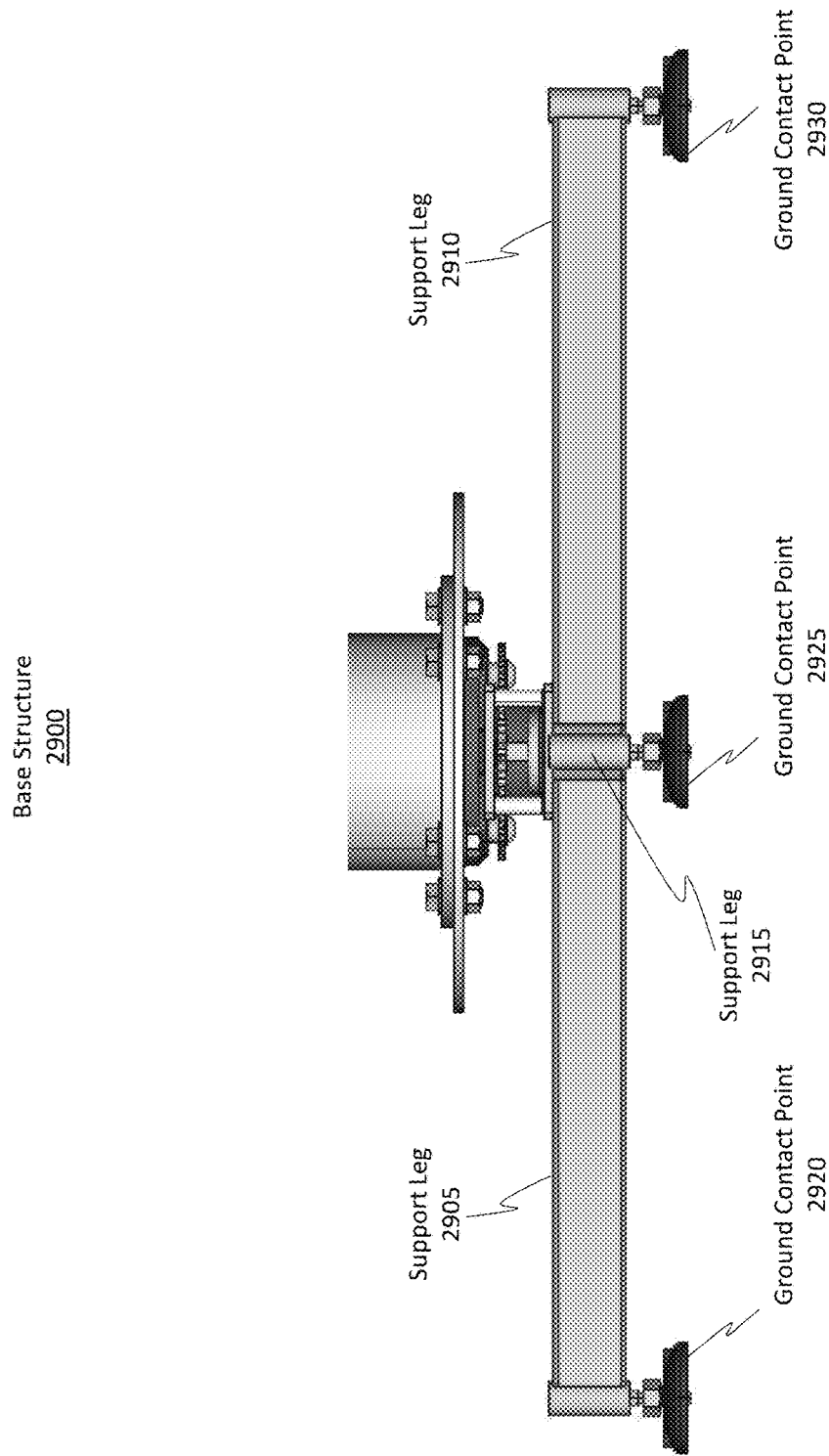
FIG. 29 illustrates the base structure.

FIG. 29 shows the base structure 2900. The base structure 2900 typically includes four supporting legs, three of which are shown in FIG. 29 (e.g., support legs 2905, 2910, and 2915). Each leg includes a ground contact point, as shown by ground contact points 2920, 2925, and 2930.

FIG. 30 again shows the base structure and the central axis 3000, which is representative of the central axis mentioned previously. Also shown is the support leg 3005 and a stop position unit 3010.

The stop position unit 3010 operates in concert with a number of stop positions, some of which are labeled as stop positions 3015, 3020, 3025, 3030, and 3035. The stop positions are divots or hollowed out portions on a rotatable disc. The stop position unit 3010 and the stop positions allow the rotatable bicycle storage carousel to stop at a defined position. Typically, each bicycle storage assembly is associated with its own corresponding stop position. Thus, if there are 12 bicycle storage assemblies, then there will be 12 stop positions. Each stop position is located on the rotatable disc to cause the corresponding bicycle storage assembly to stop immediately before the lockable door.

FIG. 31 provides further clarification regarding the stop position unit. In particular, FIG. 31 shows how the stop position unit 3100 includes a tracker ball 3105. The tracker ball 3105 is rotatable via a set of ball bearings, as shown by ball bearing 3110. A spring 3115 exerts a force on the tracker ball 3105 to influence the tracker ball 3105 to an upward position, where a portion of the tracker ball 3105 rises above the upper surface of the stop position unit 3100.

Returning to FIG. 30, when a stop position is positioned immediately above the stop position unit 3010, the tracker ball enters the stop position and causes the carousel to stop at that position. When the carousel rotates, such that the tracker ball is no longer entering a stop position, the tracker ball is pushed downward and the springs are compressed. In this manner, the embodiments can provide a number of stop positions for the carousel.

Accordingly, the stop position unit includes a ball running on a base of smaller recirculating ball bearings, and that ball is spring loaded upward. The stop position unit is in a fixed position and works in conjunction with the oval slots (i.e. the stop positions) in the rotating base to be the 12 detent stop positions.

Figure 30:
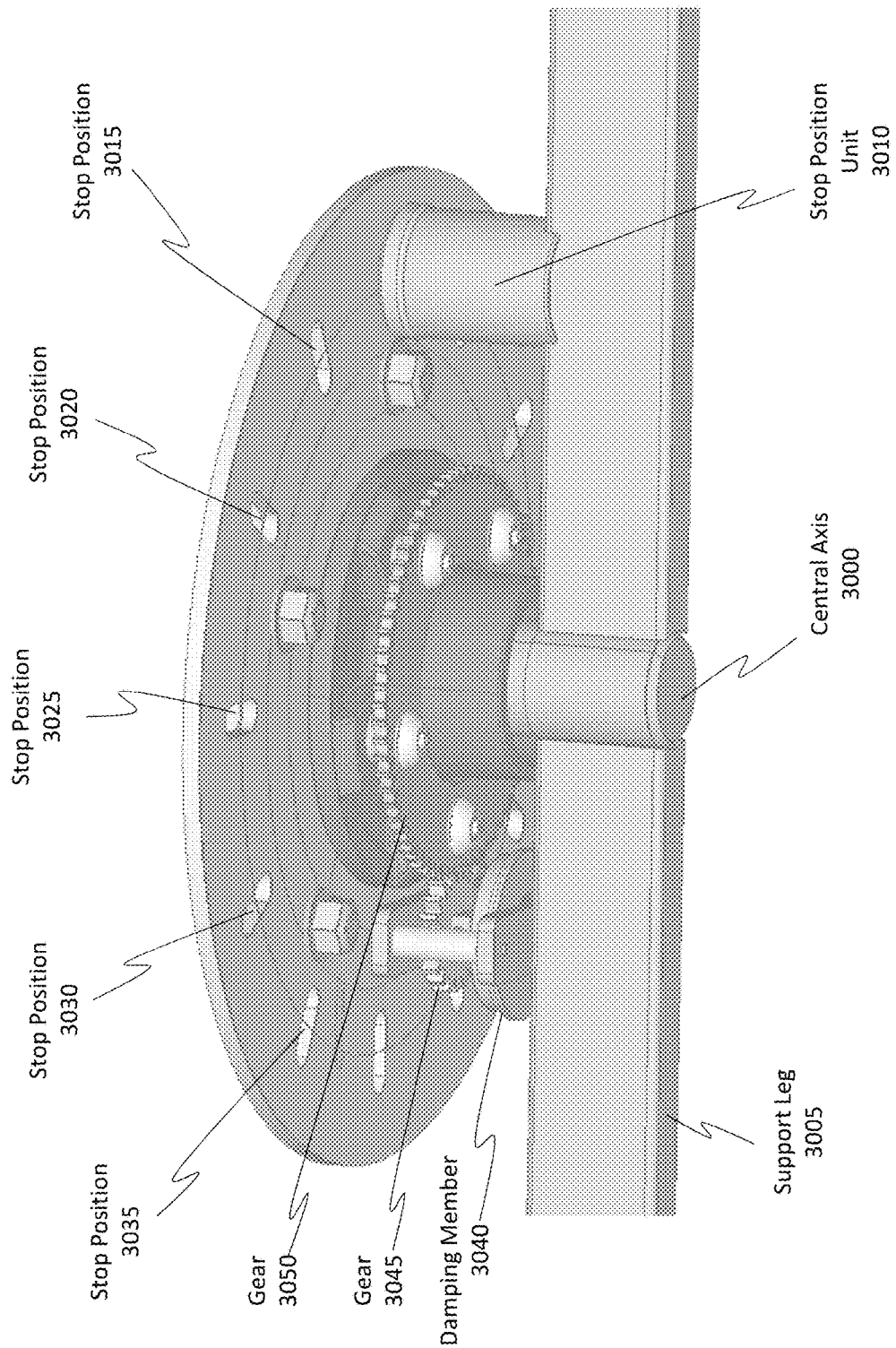
FIG. 30 illustrates various aspects of the damping member and the stop position unit.

FIG. 30 also shows various members that are provided to limit, reduce, or otherwise dampen the rotational momentum or velocity of the carousel. In particular, FIG. 30 shows a damping member 3040, a gear 3045, and another gear 3050. The damping member 3040 can be a hydraulic damping member structured to limit the rotational velocity of the carousel. The gears 3045 and 3050 are provided to further facilitate the damping of the momentum or velocity. Using these components, the embodiments are able to control the rotational speed/velocity, acceleration, or momentum of the carousel. Accordingly, the damping unit is provided to prevent the user from being able to rotate the carousel too quickly. In cases where the barricade is in the form of the wall, the wall can also act as a hinderance to spinning the carousel too quickly because the wall will be at least partially impeded by the air.

In the motorized version, which could use either a servomotor or a stepper motor, the motor control unit can control all rotation parameters. These parameters include rotary acceleration rate, deceleration rate, max revolutions per minute, and even the stop positions. Thus, in the motorized version, the embodiments can refrain from having physical stop positions incorporated into a rotatable disc.

Network Operability

Figure 32:
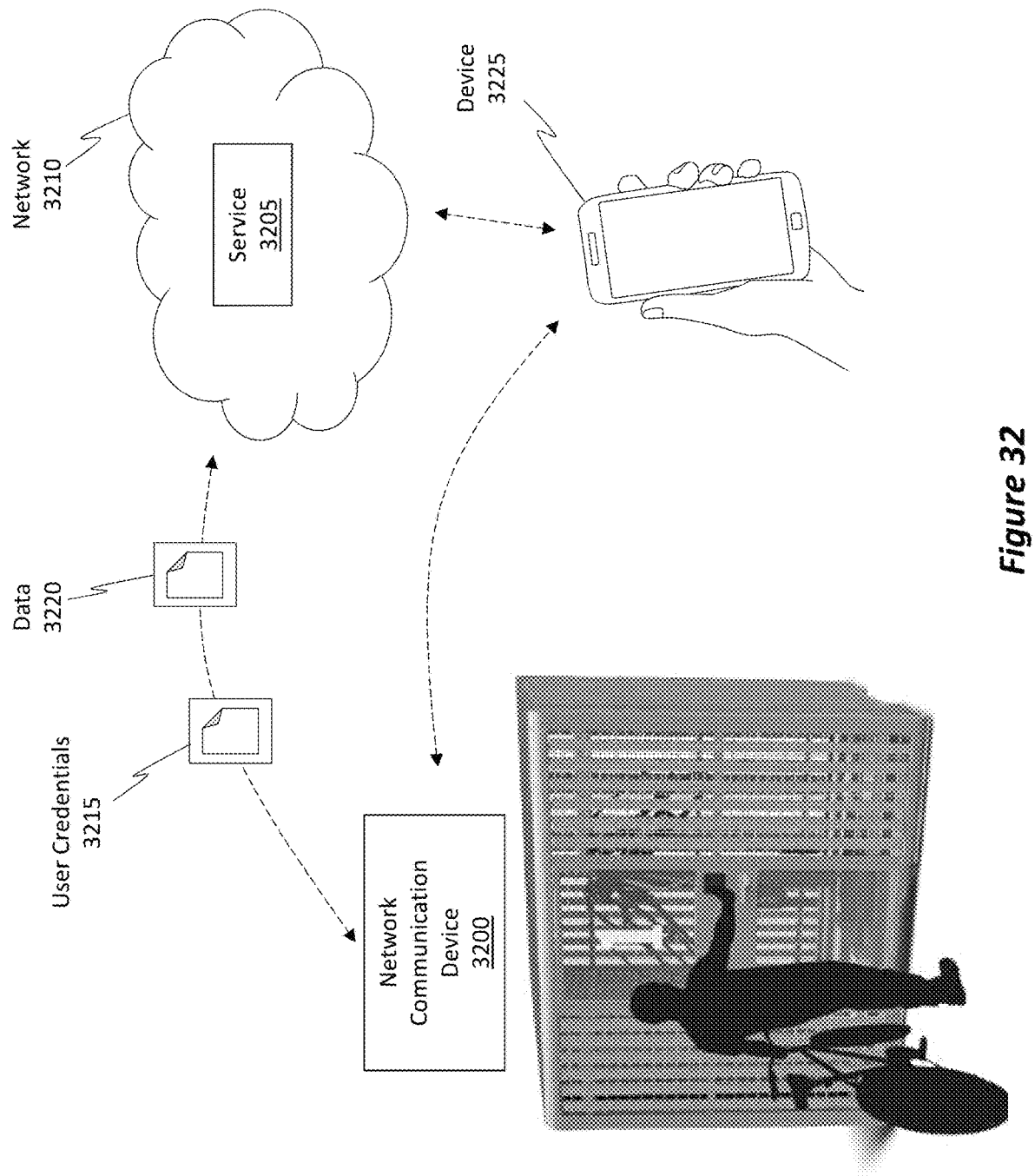
FIG. 32 illustrates how the bicycle storage unit is configured to communicate over a network.

As shown in FIG. 32, the bicycle storage unit can further include a network communication device 3200. In some cases, this network communication device 3200 can include capabilities to communicate over a telecommunications network, such as any type of 3G, 4G, 5G, or any other type of communication network. In some cases, the network communication device 3200 can be connected to a router either via a wireless connection or perhaps even a wired connection.

The network communication device 3200 communicates with a service 3205 operating in a network 3210, such as the cloud network. These communications can be used to verify a set of user credentials 3215 to allow a user to store or access a bicycle in the bicycle storage unit. The service 3205 stores information detailing what specific bicycle storage assembly the user's bicycle is or will be stored on. The service 3205 also maintains an account for the user, where the account can include the user's information as well as potentially billing information. Any other type of data 3220 can also be transmitted between the network communication device 3200 and the service 3205. Additionally, the network communication device 3200 can communicate with a user's smart device, as illustrated by the device 3225. The device 3225 can also communicate with the service 3205.

In some embodiments, a user can be provided with a notification if that user's bicycle has been stored in the unit for a prolonged period of time. In this regard, the notification can prompt the user as to whether the user has abandoned his/her bicycle. The cloud service can also facilitate billing so that the user is billed at a regular cycle for storing a bicycle.

The disclosed embodiments are able to log and report usage data to the cloud service. This usage data can include revenue data, ingress and egress events (e.g., how long is the door open) as well as state and fault monitoring for controls and sensors. In this manner, any type of telemetry or metric data can be acquired and transmitted over the network.

The cloud service can determine whether the unit is being used in an efficient manner. If not, then a notification can be triggered to inform an administrator that the unit should be moved to a new location in an effort to achieve better utilization of the unit.

Optionally, the unit can be accessed via Bluetooth or via another network connection. When accessed via a network connection, a listing of available bicycle parking spaces can be identified and displayed on the user's smart device.

In some embodiments, the cloud service can be used to enable a first user to grant access to his/her bicycle stored in the unit to a second user. That is, access rights can be transferred or given to a third party, such as perhaps a bicycle mechanic who is tasked with repairing the bicycle during its parked period.

Optionally, the user can use the application to access the unit or perhaps even to reserve a space in the unit prior to being present at the unit. For instance, a user can reserve a specific bicycle storage assembly in the unit at any time via the user application. In some cases, a user can subscribe with the cloud service so the user can use any bicycle storage unit at any time due to his/her subscription. Optionally, different levels or tiers of service can be provided based on the type of subscription the user has. In some cases, a VIP service can even be provided, where that VIP service can include a maintenance technician servicing the user's bicycle while it is being stored. The unit can also include an emergency call box function.

In some cases, a user can log into his/her account and use the account to identify units that are within a specific geographic area. For instance, if the user is in Pittsburgh, PA, the user can log into his/her account to identify the units that are available in that city. The user's account can also use the user's GPS coordinates to determine how far the user is relative to a particular unit. From that account, the user can further discern how many parking spots are available.

Optionally, the unit and/or the service can include intelligence for analyzing video streams or images. For instance, the unit and/or the cloud service can record a user while the user is attempting to store a bicycle. The service can analyze the recording to determine whether the user is properly following a set of instructions on how to store the bicycle. The cloud service can further determine whether the bicycle is sized sufficiently to fit in the unit. If the user is not following the instructions or if the bicycle is not sized correctly, then the service can trigger an alert to the user to inform him/her to follow the instructions or to not attempt to store the bicycle. Furthermore, the cloud service can prevent the door from locking and/or prevent the carousel from rotating.

In some cases, the camera system can also alert local authorities if the system determines a malicious person is trying to improperly gain entry to the unit. In some cases, an audible and/or visual alert or alarm can also be triggered in response to the malicious person. In some cases, an alert can be sent to a user's mobile device, such as perhaps an SMS text message, a voice call, email, or perhaps an app notification, if the user's bicycle is moved by another individual while the door is open (e.g., that other person is attempting to move a bicycle that is not his/her own bicycle).

The system can also provide alerts when the unit breaks down for whatever reason. For instance, if a sensor or hardware part of the unit is in disrepair, the service can detect this disrepair and trigger an alert to an administrator so the unit can be fixed.

EXAMPLES

Accordingly, some embodiments disclosed herein are directed to a rotatable bicycle storage carousel structured to rotate about a central axis to provide for a dense storage of bicycles that are stored on the rotatable bicycle storage carousel in a generally vertical orientation. The rotatable bicycle storage carousel comprises an elongated central core oriented in a first direction that is orthogonal relative to a plane defined by a base structure of the rotatable bicycle storage carousel. The elongated central core is rotatable relative to the base structure.

The carousel further includes multiple bicycle storage assemblies. Each bicycle storage assembly is attached to the elongated central core such that the bicycle storage assemblies are rotatable with the elongated central core. The bicycle storage assemblies are attached to the elongated central core at alternating heights relative to one another.

Further, each bicycle storage assembly includes a first storage assembly comprising a barricade and a wheel hook attached to the barricade. The wheel hook is configured to enable a bicycle tire to hang therefrom. The barricade is configured to at least partially block access to an adjacently located bicycle storage assembly. In some embodiments, the wheel hook is not attached to the barricade; rather, the wheel hook is a separate component.

Each bicycle storage assembly further includes a second storage assembly comprising a wheel cradle that is disposed underneath the wheel hook in the first direction. As a consequence, when the bicycle tire is attached to the wheel hook, at least a portion of the bicycle tire is simultaneously cradled by the wheel cradle.

In some cases, the bicycle storage assemblies include at least 12 bicycle storage assemblies attached to the elongated central core. In some implementations, the rotatable bicycle storage carousel further includes a lift assist structured to facilitate lifting of the bicycle tire into a position so as to be hung on a particular wheel cradle. Optionally, a curved ramp can be disposed at the base of the carousel. The user can push his/her bicycle up this curved ramp, and the curvature will help the user lift the bicycle into place on the wheel hook.

In some embodiments, the rotatable bicycle storage carousel further includes a damping member structured to dampen a rotational momentum or velocity of the elongated central core to cause the elongated central core to stop at one of multiple available stop positions. Here, a number of the stop positions is equal to a number of the bicycle storage assemblies.

In some cases, the elongated central core is manually rotatable. In some cases, the elongated central core is rotatable via an electric motor.

In some embodiments, the rotatable bicycle storage carousel comprises an elongated central core oriented in a first direction that is orthogonal relative to a plane defined by a base structure of the rotatable bicycle storage carousel. The elongated central core is rotatable relative to the base structure. The carousel further includes a plurality of bicycle storage assemblies.

Each bicycle storage assembly is attached to the elongated central core such that the bicycle storage assemblies are rotatable with the elongated central core. Each bicycle storage assembly stacks a respective bicycle generally in parallel with the first direction.

The carousel further includes a damping member structured to dampen a rotational momentum or velocity of the elongated central core when the rotatable bicycle storage carousel is rotated. The carousel further includes a stop position unit structured to cause the elongated central core to stop at one of a plurality of available stop positions. Here, a number of the stop positions is equal to a number of bicycle storage assemblies.

In some embodiments, the rotatable bicycle storage carousel further includes a plurality of tire rests that are attached to the elongated central core and that are located underneath the bicycle storage assemblies in the first direction. The plurality of tire rests are attached to the elongated central core at positions that are relatively closer to the base structure as compared to an upper, distal end of the elongated central core.

Beneficially, the rotatable bicycle storage carousel can be a portable unit.

In some implementations, each bicycle storage assembly includes a corresponding barricade configured to at least partially block access to an adjacently located bicycle storage assembly. The barricade is comprised of an extended arm that extends in a radially outward direction relative to the elongated central core. The extended arm comprises (i) a first section, (ii) a bent region located at a terminal end of the first section, and (iii) a second section extending from the bent region. The bent region forms a bend in the extended arm such that the second section is angled relative to the radially outward direction.

Each bicycle storage assembly can further include a corresponding wheel hook. Optionally, the wheel hook can be attached to the barricade. In some embodiments, the wheel hook is a separate component relative to the barricade.

In some embodiments, the base structure includes a number of ground contact points. Often, this number corresponds to the number of support legs, and the number of support legs is often 4. That is, in some implementations, the base structure includes at least four support legs that define a plane that is orthogonal to the first direction.

Some embodiments are directed to a bicycle storage unit. This unit includes a rotatable bicycle storage carousel structured to rotate about a central axis to provide for a dense storage of bicycles that are stored on the rotatable bicycle storage carousel in a generally vertical orientation. The rotatable bicycle storage carousel comprises an elongated central core oriented in a first direction that is orthogonal relative to a plane defined by a base structure of the rotatable bicycle storage carousel. The elongated central core is rotatable relative to the base structure.

The unit further includes a plurality of bicycle storage assemblies. Each bicycle storage assembly is attached to the elongated central core such that the bicycle storage assemblies are rotatable with the elongated central core. Also, each bicycle storage assembly stacks a respective bicycle generally in parallel with the first direction.

The unit also includes an enclosure structured to surround the rotatable bicycle storage carousel and structured to restrict access to the rotatable bicycle storage carousel. The enclosure comprises 4 side walls and optionally a roof connected to the 4 side walls. The enclosure further includes a lockable door that is disposed in a first side wall included among the 4 side walls. The rotatable bicycle storage carousel is rotatable within the confines of the enclosure, and access to a bicycle stored on the rotatable bicycle storage carousel is restricted.

In some embodiments the enclosure further includes one or more of: one or more storage compartments; a floor; one or more solar panels; or a network communication device that is configured to communicate with a cloud service. In some cases, the unit also includes a network communication device that can be used to facilitate communications with a cloud service.

Although a majority of this disclosure has focused on scenarios where the bicycles are hung in a vertical manner, the embodiments can also provide a system whereby the bicycles are stored horizontally. That is, bicycles can be arranged horizontally in lifting trays that revolve around the horizontal axis, thereby negating any need for lifting a portion of the bicycle.

In some embodiments, the enclosure might have a circular footprint (e.g., be cylindrical in shape) as opposed to having a square or rectangular footprint. With a cylindrical shape, some embodiments include a slidable door that is disposed on a rail or track around the cylinder so as to facilitate the movement of the door. Optionally, the carousel might remain stationary, but the door can move relative to the central axis to provide a user access to a particular bicycle storage assembly.

As another example, for units that have a roof, the elongated central core can be coupled or attached to the roof. The base structure of the carousel can be attached to the floor. Consequently, this unit can provide a top and bottom point of contact for the carousel, thereby preventing possible wobbling in the carousel when it rotates. Alternatively, the elongated central core may not be attached to the roof.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 33:
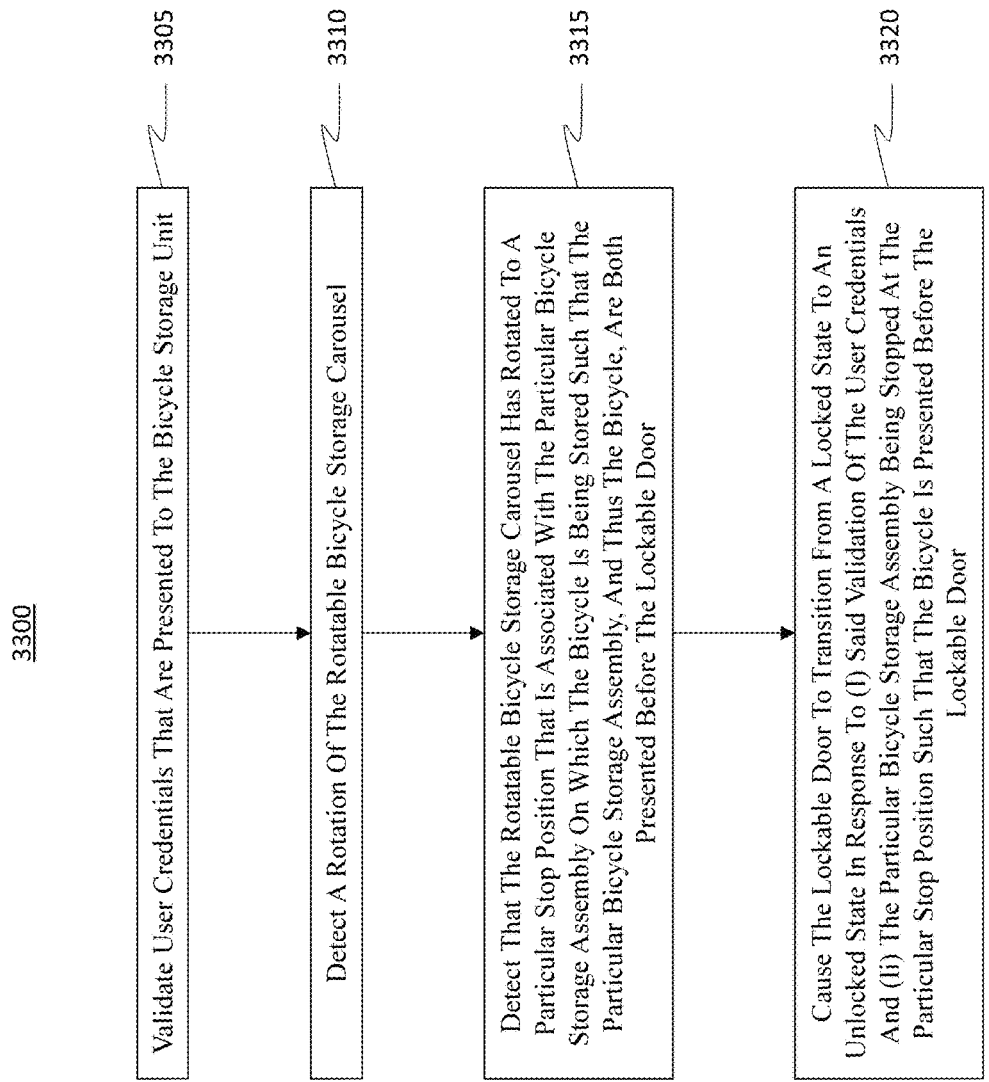
FIG. 33 illustrates a flowchart of an example method for storing and accessing a bicycle in a bicycle storage unit.

Attention will now be directed to FIG. 33, which presents a flowchart of an example method 3300 for storing and accessing a bicycle in a bicycle storage unit, where the bicycle storage unit includes a rotatable bicycle storage carousel structured to rotate about a central axis to provide for a dense storage of bicycles that are stored on the rotatable bicycle storage carousel in a generally vertical orientation and where the bicycle storage unit further includes an enclosure structured to surround the rotatable bicycle storage carousel and structured to restrict access to the rotatable bicycle storage carousel via a lockable door.

Method 3300 includes an act (act 3305) of validating user credentials that are presented to the bicycle storage unit. Notably, the rotatable bicycle storage carousel includes a plurality of bicycle storage assemblies that are each structured to store a respective bicycle, and the user credentials are associated with a particular bicycle storage assembly on which a bicycle is being stored on.

Act 3310 includes detecting a rotation of the rotatable bicycle storage carousel. The rotatable bicycle storage carousel is rotatable throughout a plurality of stop positions to thereby present, via the rotation of the bicycle storage carousel, different ones of the bicycle storage assemblies before the lockable door.

Act 3315 includes detecting that the rotatable bicycle storage carousel has rotated to a particular stop position that is associated with the particular bicycle storage assembly on which the bicycle is being stored. As a result, the particular bicycle storage assembly, and thus the bicycle, are both presented before the lockable door.

Act 3320 includes causing the lockable door to transition from a locked state to an unlocked state in response to (i) the validation of the user credentials and (ii) the particular bicycle storage assembly being stopped at the particular stop position such that the bicycle is presented before the lockable door. While the lockable door is open, the rotatable bicycle storage carousel is prevented from being rotated. Preventing the carousel from rotating can be achieved via an impeding blocker that can be triggered when the door is open. For instance, the blocker can be lodged within one of the stop positions to restrict the rotation of the carousel. In some cases, an additional barricade is dropped down or otherwise implemented to prevent the carousel from rotating. Optionally, the carousel can be prevented from rotating by the servomotor.

While the lockable door is open, access to adjacent bicycle storage assemblies relative to the particular bicycle storage assembly is hindered via barricades such that access to any adjacently stored bicycles is also hindered via the barricades.

Example Computer/Computer Systems

Attention will now be directed to FIG. 3400 which illustrates an example computer system 3400 that may include and/or be used to perform any of the computing operations described herein, such as with regard to validating user credentials, controlling a servomotor, communicating with a network service, controlling cameras and streaming video data, and so on. Computer system 3400 may take various different forms. Computer system 3400 may also be a distributed system that includes one or more connected computing components/devices that are in communication with computer system 3400. The computing system 3400 can also be in the form of an edge computing device.

Figure 34:
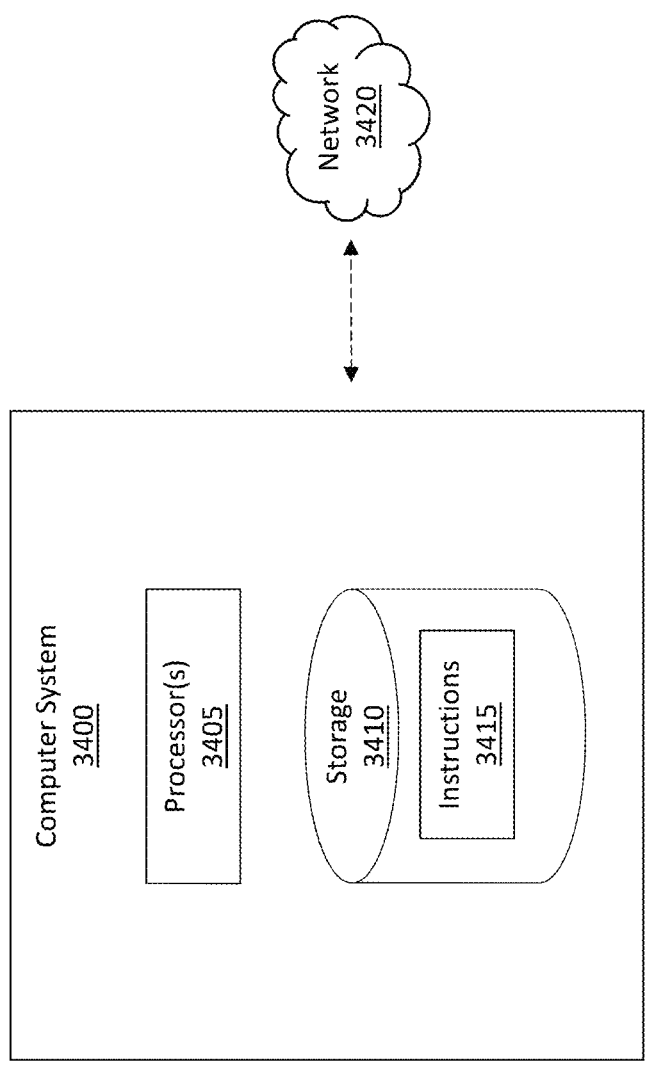
FIG. 34 illustrates an example computer system that is configured to perform any of the disclosed computing operations.

In its most basic configuration, computer system 3400 includes various different components. FIG. 34 shows that computer system 3400 includes one or more processor(s) 3405 (aka a "hardware processing unit") and storage 3410.

Regarding the processor(s) 3405, it will be appreciated that the functionality described herein can be performed, at least in part, by one or more hardware logic components (e.g., the processor(s) 3405). For example, and without limitation, illustrative types of hardware logic components/ processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 3400. The different components, modules, engines, and services described herein may be implemented as objects or processors that execute on computer system 3400 (e.g. as separate threads).

Storage 3410 may be physical system memory, which may be volatile, non-volatile, or some combination of the two. The term "memory" may also be used herein to refer to non-volatile mass storage such as physical storage media. If computer system 3400 is distributed, the processing, memory, and/or storage capability may be distributed as well.

Storage 3410 is shown as including executable instructions 3415. The executable instructions 3415 represent instructions that are executable by the processor(s) 3405 of computer system 3400 to perform the disclosed operations, such as those described in the various methods.

The disclosed embodiments may comprise or utilize a special-purpose or general-purpose computer including computer hardware, such as, for example, one or more processors (such as processor(s) 3405) and system memory (such as storage 3410), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 3400 may also be connected (via a wired or wireless connection) to external sensors (e.g., one or more remote cameras) or devices via a network 3420. For example, computer system 3400 can communicate with any number devices or cloud services to obtain or process data. In some cases, network 3420 may itself be a cloud network. Furthermore, computer system 3400 may also be connected through one or more wired or wireless network to remote/separate computer systems(s) that are configured to perform any of the processing described with regard to computer system 3400.

A "network," like network 3420, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 3400 will include one or more communication channels that are used to communicate with the network 3420. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A rotatable bicycle storage carousel structured to rotate about a central axis to provide for a dense storage of bicycles that are stored on the rotatable bicycle storage carousel in a generally vertical orientation, said rotatable bicycle storage carousel comprising:
   an elongated central core oriented in a first direction that is orthogonal relative to a plane defined by a base structure of the rotatable bicycle storage carousel, wherein the elongated central core is rotatable relative to the base structure; and
   a plurality of bicycle storage assemblies, wherein each bicycle storage assembly in the plurality of bicycle storage assemblies is attached to the elongated central core such that the plurality of bicycle storage assemblies are rotatable with the elongated central core, wherein the bicycle storage assemblies in the plurality are attached to the elongated central core at alternating heights relative to one another, and wherein each bicycle storage assembly in the plurality of bicycle storage assemblies includes:
   a first storage assembly comprising a barricade and a wheel hook attached to the barricade, wherein the wheel hook is configured to enable a bicycle tire to hang therefrom, and wherein the barricade is configured to at least partially block access to an adjacently located bicycle storage assembly; and
   a second storage assembly comprising a wheel cradle that is disposed underneath the wheel hook in the first direction such that, when the bicycle tire is attached to the wheel hook, at least a portion of the bicycle tire is simultaneously cradled by the wheel cradle.

2. The rotatable bicycle storage carousel of claim 1, wherein the plurality of bicycle storage assemblies includes at least 12 bicycle storage assemblies attached to the elongated central core.

3. The rotatable bicycle storage carousel of claim 1, wherein the rotatable bicycle storage carousel includes a lift assist structured to facilitate lifting of the bicycle tire into a position so as to be hung on a particular wheel cradle.

4. The rotatable bicycle storage carousel of claim 1, wherein the rotatable bicycle storage carousel includes a damping member structured to dampen a rotational velocity of the elongated central core to cause the elongated central core to stop at one of a plurality of available stop positions, wherein a number of the stop positions is equal to a number of bicycle storage assemblies in the plurality of bicycle storage assemblies.

5. The rotatable bicycle storage carousel of claim 4, wherein the elongated central core is manually rotatable.

6. The rotatable bicycle storage carousel of claim 4, wherein the elongated central core is rotatable via an electric motor.

7. The rotatable bicycle storage carousel of claim 1, wherein a vertical separation distance between the alternating heights of the bicycle storage assemblies is at least 8 inches.

8. The rotatable bicycle storage carousel of claim 1, wherein the wheel cradle includes two contact regions structured to contact and cradle the bicycle tire, and wherein the two contact regions include a flat portion located between two flared sides such that the bicycle tire is at least partially cradled along an outer perimeter portion of the bicycle tire by the flat portion and along outer wall portions of the bicycle tire by the two flared sides.

9. A rotatable bicycle storage carousel structured to rotate about a central axis to provide for a dense storage of bicycles that are stored on the rotatable bicycle storage carousel in a generally vertical orientation, said rotatable bicycle storage carousel comprising:
   an elongated central core oriented in a first direction that is orthogonal relative to a plane defined by a base structure of the rotatable bicycle storage carousel, wherein the elongated central core is rotatable relative to the base structure;
   a plurality of bicycle storage assemblies, wherein:
      each bicycle storage assembly in the plurality of bicycle storage assemblies is attached to the elongated central core such that the plurality of bicycle storage assemblies are rotatable with the elongated central core, and
      each bicycle storage assembly in the plurality of bicycle storage assemblies stacks a respective bicycle generally in parallel with the first direction;
   a damping member structured to dampen a rotational velocity of the elongated central core when the rotatable bicycle storage carousel is rotated; and
   a stop position unit structured to cause the elongated central core to stop at one of a plurality of available stop positions, wherein a number of the stop positions is equal to a number of bicycle storage assemblies in the plurality of bicycle storage assemblies.

10. The rotatable bicycle storage carousel of claim 9, wherein the rotatable bicycle storage carousel further includes a plurality of tire rests that are attached to the elongated central core and that are located underneath the plurality of bicycle storage assemblies in the first direction, and wherein the plurality of tire rests are attached to the elongated central core at positions that are relatively closer to the base structure as compared to an upper, distal end of the elongated central core.

11. The rotatable bicycle storage carousel of claim 9, wherein the rotatable bicycle storage carousel is a portable unit.

12. The rotatable bicycle storage carousel of claim 9, wherein each bicycle storage assembly in the plurality of bicycle storage assemblies includes a corresponding barricade configured to at least partially block access to an adjacently located bicycle storage assembly, wherein the barricade is comprised of an extended arm that extends in a radially outward direction relative to the elongated central core, the extended arm comprising (i) a first section, (ii) a bent region located at a terminal end of the first section, and (iii) a second section extending from the bent region, and wherein the bent region forms a bend in the extended arm such that the second section is angled relative to the radially outward direction.

13. The rotatable bicycle storage carousel of claim 9, wherein the bicycle storage assemblies in the plurality are attached to the elongated central core at alternating heights relative to one another.

14. A rotatable bicycle storage carousel structured to rotate about a central axis to provide for a dense storage of bicycles that are stored on the rotatable bicycle storage carousel in a generally vertical orientation, said rotatable bicycle storage carousel comprising:
   an elongated central core oriented in a first direction that is orthogonal relative to a plane defined by a base structure of the rotatable bicycle storage carousel, wherein the elongated central core is rotatable relative to the base structure; and a plurality of bicycle storage assemblies, wherein each bicycle storage assembly in the plurality of bicycle storage assemblies is attached to the elongated central core such that the plurality of bicycle storage assemblies are rotatable with the elongated central core, wherein the bicycle storage assemblies in the plurality are attached to the elongated central core at alternating heights relative to one another, and wherein each bicycle storage assembly in the plurality of bicycle storage assemblies includes:

a first storage assembly comprising a barricade and a wheel hook attached to the barricade, wherein the wheel hook is configured to enable a bicycle tire to hang therefrom, and wherein the barricade is configured to at least partially block access to an adjacently located bicycle storage assembly; and a second storage assembly comprising a wheel cradle that is disposed underneath the wheel hook in the first direction such that, when the bicycle tire is attached to the wheel hook, at least a portion of the bicycle tire is simultaneously cradled by the wheel cradle, and wherein the rotatable bicycle storage carousel is a portable unit.

15. The rotatable bicycle storage carousel of claim 14, wherein the rotatable bicycle storage carousel includes a base structure, and wherein the elongated central core is rotatable relative to the base structure.

16. The rotatable bicycle storage carousel of claim 15, wherein the base structure is stationary when in contact with a ground area.

17. The rotatable bicycle storage carousel of claim 14, wherein the rotatable bicycle storage carousel includes a tire rest.

18. The rotatable bicycle storage carousel of claim 14, wherein the rotatable bicycle storage carousel further includes an optical sensor configured to detect a presence of a bicycle.

19. The rotatable bicycle storage carousel of claim 14, wherein the rotatable bicycle storage carousel further includes a bicycle lift assist.

20. The rotatable bicycle storage carousel of claim 14, wherein the rotatable bicycle storage carousel is rotatable via an electric motor.

* * * * *